(12) United States Patent
Bevilacqua et al.

(10) Patent No.: US 10,650,193 B1
(45) Date of Patent: *May 12, 2020

(54) SYSTEM AND METHOD FOR SEMIOTIC DIGITAL ENCODING

(71) Applicant: Bevilacqua Research Corporation, Inc, Huntsville, KY (US)

(72) Inventors: Andy Bevilacqua, Huntsville, AL (US); Roy Brown, Huntsville, AL (US); Glenn Hembree, Huntsville, AL (US)

(73) Assignee: Bevilacqua Research Corp, Huntsville, AL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/537,611

(22) Filed: Aug. 11, 2019

Related U.S. Application Data

(63) Continuation-in-part of application No. 15/874,838, filed on Jan. 18, 2018, now Pat. No. 10,437,930.

(51) Int. Cl.
*G06F 17/21* (2006.01)
*G06F 40/30* (2020.01)
*G06F 8/65* (2018.01)
*G06F 16/901* (2019.01)
*G06F 40/149* (2020.01)

(52) U.S. Cl.
CPC .............. *G06F 40/30* (2020.01); *G06F 8/65* (2013.01); *G06F 16/9024* (2019.01); *G06F 40/149* (2020.01)

(58) Field of Classification Search
USPC ....................................................... 704/7–10
See application file for complete search history.

(56) References Cited

U.S. PATENT DOCUMENTS

| | | | |
|---|---|---|---|
| 7,043,094 B2* | 5/2006 | Thomas | G06K 9/342 382/305 |
| 2003/0113017 A1* | 6/2003 | Thomas | G06K 9/342 382/181 |
| 2006/0150153 A1* | 7/2006 | Altman | G06F 21/51 717/116 |
| 2018/0053021 A1* | 2/2018 | Rasheed | G06T 19/006 |
| 2018/0278504 A1* | 9/2018 | Alazraki | H04L 12/1822 |

* cited by examiner

*Primary Examiner* — Leonard Saint Cyr
(74) *Attorney, Agent, or Firm* — Chris Tanner; FYPA PLLC

(57) ABSTRACT

A system and method for lowering probability that low data rates, high bit error rates, and susceptibility to signal degradation in communication environments during storms, solar activity, and adversarial activity is disclosed. The system and method affect communications by minimizing the amount of data/information that needs to be transmitted, partly by creating an algorithmic process/method that moves knowledge and not data and information. The system and method is based upon the realization that structured communications often possess a similar level of context that can be exploited to communicate full meaning (knowledge), even when only a small fraction of the message is transmitted to the receiver. Reducing the number of bytes transmitted significantly reduces the probability that a transmission will be affected by either naturally occurring or human supplied factors present in modern communication environments.

20 Claims, 25 Drawing Sheets

Shadow　　　　　　　Warrior　　　　　　　Grasshopper

Silverfox　　　　　　Scan Eagle　　　　　　Hammerhead

Kingfisher　　　　　　Aerosonde　　　　　　Blade

| Unique ID | Field | Data Element Name & Description | Type | Units | Range |
|---|---|---|---|---|---|
| 3003.00 | 0 | Presence Vector | Unsigned 1 | Bitmapped | No Restrictions |
| 0109.01 | 1 | Time Stamp | Unsigned 5 | 0.001 s | See Section 1.7.2 |
| 0109.04 | 2 | Altitude Mode | Unsigned 1 | Enumerated | 0 = Configuration<br>1 = Manual/ Override until reaching the Waypoint or Loiter Point<br>2 = Manual/ Override |
| 0109.05 | 3 | Speed Mode | Unsigned 1 | Enumerated | 0 = Configuration<br>1 = Manual/ Override until reaching the Waypoint or Loiter Point<br>2 = Manual/ Override |
| 0109.06 | 4 | Heading Mode | Unsigned 1 | Enumerated | 0 = Configuration<br>1 = Manual/ Override until reaching the Waypoint or Loiter Point<br>2 = Manual/ Override |

FIG. 3A

SYSTEM AND METHOD FOR SEMIOTIC DIGITAL ENCODING

BACKGROUND OF THE INVENTION

Future conflicts will undoubtedly involve the need to communicate large amounts of information into, out of and within anti-access, area denial (A2AD) environments. These environments pose a special challenge for the Navy because of the large geographical areas over which they must operate and their resulting dependence on vulnerable satellite data links. High Frequency (HF) radio communication systems have long been valued for beyond line-of-sight links, but over the last few decades they have slowly been replaced with more robust communications via an expanding array of satellite networks. The saturation of the satellite communication spectrum, the selling of parts of the spectrum to commercial entities, and the ease with which these assets can be electronically jammed has caused a renewed interest in the use of the HF bands.

Commercially available HF radios suffer from low data rates, high bit error rates, and susceptibility to signal degradation during storms and solar activity. Not only must the information communicated be complete while operating under difficult environmental conditions, it must be secure to avoid man-made interference such as jamming, electromagnetic pulses (EMP) and interception and decoding by adversaries within the A2AD operational area.

In response, a mechanism to lower the probability that any of the factors mentioned above would effect communications by minimizing the amount of data/information that needs to be transmitted is desired. This is achieved by creating an algorithmic process/method that moves knowledge and not data and information.

BRIEF DESCRIPTION OF DRAWINGS

FIG. 3A is a non-limiting example of a structured message;

DETAILED DESCRIPTION OF THE PREFERRED EMBODIMENTS

Figure 1A:
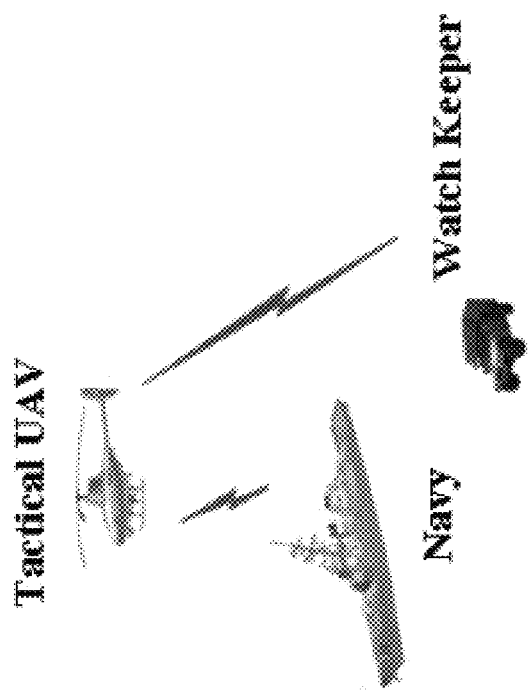
FIGS. 1A, 1B, 1C, and 1D show Prior Art devices having communication arrangements that can benefit from the embodiments herein.
Figure 1B:
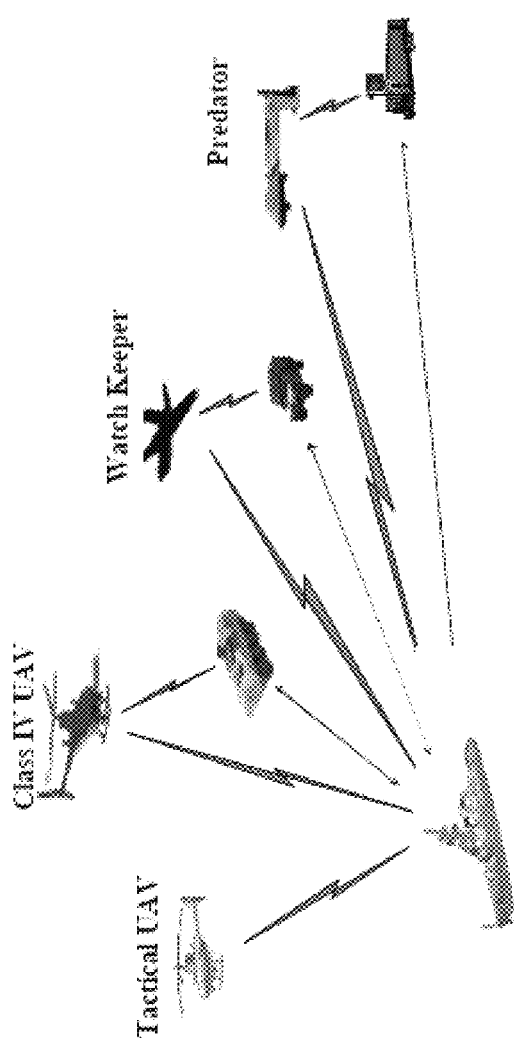
Figure 1C:
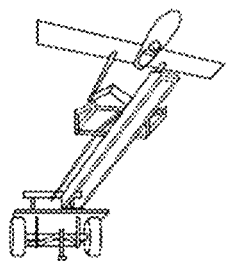
Figure 1C:
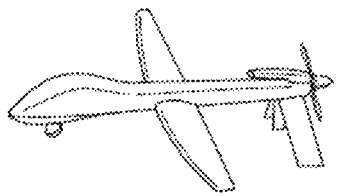
Figure 1C:
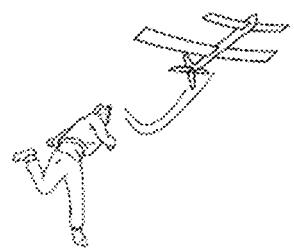
Figure 1C:
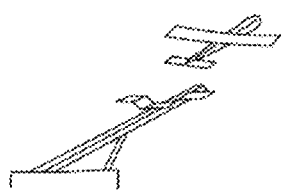
Figure 1C:
Figure 1C:
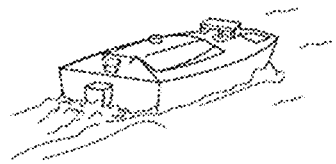
Figure 1C:
Figure 1C:
Figure 1C:
Figure 1D:
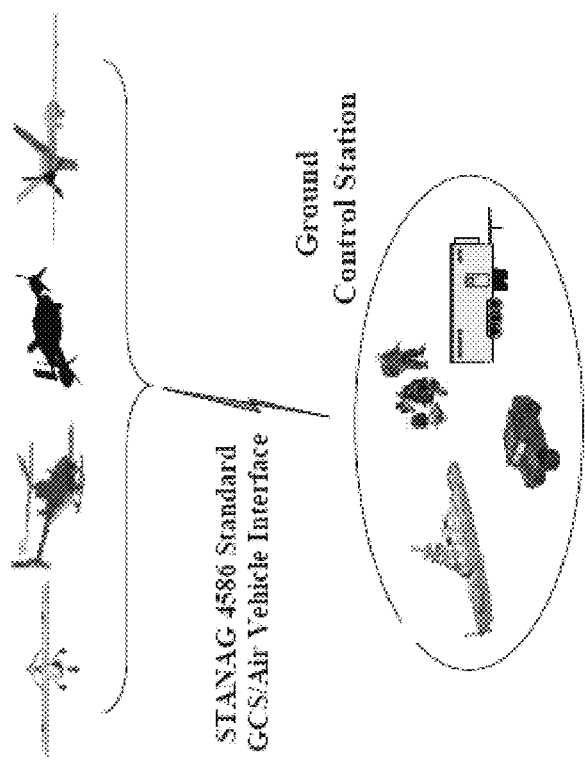

It is well-known in the field of psychology that the human brain enhances its ability to maximize human survival by adopting ultra-efficient operating strategies. Many of these efficiencies involve what appear to be mental short cuts that provide the minimum required knowledge necessary to allow humans to quickly and efficiently solve problems ultimately related to their need to respond quickly to threats. A well-known example is the ability of humans to gain a full understanding of written communications when they read cryptic sentences with missing words or jumbled letters. In this specific case the brain provides understanding needed to the human by using the information naturally present in the context between the letters and words being read. In other words, the logical structure in a sentence carries a great deal of information about the meaning being communicated by that sentence.

The embodiments herein are based upon the realization that structured communications possess a similar level of context that can be exploited to communicate full meaning (knowledge) even when only a small fraction of the message is transmitted to the receiver.

Reducing the number of bytes transmitted significantly reduces the probability that a transmission will be affected by either naturally occurring or human supplied factors present in modern A2AD environments.

FIGS. 1A, 1B, 1C, and 1D show non-limiting Prior Art example devices having communication arrangements that can benefit from the embodiments herein. While FIGS. 1A-1D show Unmanned Aerial Vehicles (UAVs), the embodiments herein should not be considered as limited to UAVs.

Some UAVs communicate in known, specific protocols, which can include but are not limited to STANAG4586 and JAUS. STANAG 4586 (NATO Standardization Agreement 4586) is a NATO Standard Interface of the Unmanned Control System (UCS) Unmanned Aerial Vehicle (UAV) interoperability. STANAG4586 defines architectures, interfaces, communication protocols, data elements and message formats. Another communication protocol is Joint Architecture for Unmanned Systems (JAUS).

Communication devices working with STANAG or other data-configuration may have several one byte words which they are only using first bit value, e.g. "yes" or "no", or first 3 bit values, e.g. numbers from 0-8. From a typical, conventional computing-efficiency standpoint, it is cheaper to just store the entire byte even though there are only 3 bits of actual value, rather try to store only 3 bits of a much larger byte. Thus, for most contexts, it is more efficient to transfer data using such standard, easily transportable data-size-units (bytes), somewhat comparable to container-loads on a Long Beach Calif. shipping dock. Thus, one reason the embodiments described herein are not used on typical computers is because it's easier to retrieve an entire byte or bring up a word and put back a word, that is to try to parse, mask, and manipulate the individual bits within a byte.

The embodiments herein reduce the amount of information that needs to go through the pipeline in order to be successful transmitted from point A and successfully received by point B. It's easier to successfully transmit/receive a smaller amount through the communication spread frequencies than larger amounts of data. A hardware communication device that was doing a lot of frequency-skipping, e.g. spread spectrum or skipping spectrum, would work well with the embodiments herein.

It is important to note that the SDE embodiments described herein are not designed to obscure or add a layer of security. Instead, the embodiments herein act to reduce data loss. However, it is understandable if persons working with the embodiments herein use expressions such as data compression, encryption, as the embodiments herein can sometimes be confused with such elements. But make no mistake: the embodiments herein are neither data compression nor encryption. A better expression might be "bandwidth enhancement" and/or "improved communication efficiency".

Real-World Practical Usages

Unmanned aerial vehicles are a clear and obvious example of usage of the embodiments herein because of their need to send signals way up in the sky. However, the embodiments herein are not restricted to UAVs, but instead pretty much any usage which could benefit from a reduction in data stream or storage.

One possible usage is a military context, for command and control of UAVs or other remote vehicles (submarines, tanks, robots). The embodiments can make it harder for an adverse party to achieve an aerial turn off, or where the there's actively people trying to reduce the amount of data that can be sent between devices through jamming or interference.

Some large UAVs may cost the federal government as much as $10 M apiece, although most of the devices illustrated in FIGS. 1A-1D cost considerably less than that. Meanwhile, the combination of a single laptop and single panda latte may cost e.g. $150 apiece. As stated, two such combinations are needed for the embodiments herein to be effective, totaling e.g. $300. Thus, a $300 investment can potentially save the US government a $10,000,000 UAV.

Using the example of UAVs, an adverse party's primary goal might be to either disrupt communication, or to try to take over communication. Once the records in SDE system herein are in place and the two ends are connected, the SDE system then starts sending only the Delta values. An adverse party would need the original message in order to receive the entire message, because part of the data savings is to only send the Delta value. This data savings has the added advantage that unless an adverse party was in on the communications from the beginning, if they divert, intercept, or copy the signal mid-stream, they won't know what to do with the data.

So, even with a data scope, an adverse party can see a large stream of data, but that adverse party might not know where that data is going or what the data means.

Instead, the primary reason would be to either disrupt its communication or to try to take over its communication and do they do that they have in the past. Once a record is confirmed at both ends, the system then starts sending only the Delta values. In this way, an adverse party would need the original message in order to receive the entire message because part of the data savings is to only send the change in the values, which eats less bandwidth than the original value.

Next, a non-UAV example might include the Internet of things, such as municipal streetlights set up as Internet-capable. Each streetlight produces a little bit of data that has to be streamed to municipal servers or storage or something like that. Multiply the huge amount of streetlights. Not a huge amount of data for each streetlight, but after adding 1000 or 10,000 streetlights that becomes a large amount of data, which can in turn increase the necessary bandwidth for maintaining the lights. There is also a problem that hackers are sometimes taking municipalities hostage, ransomware, etc.

Now add in voice data to these streetlights or traffic lights, e.g. for blind people to know when to cross a street, and when to not go across. Also, some municipalities implant microphones in the light poles, for the purpose of public safety. For example, gunshots are another area that some municipalities monitor, sometimes from light poles, in that each gunshot may have a unique signature and can sometimes be admissible evidence in criminal court. So let's say it's a gunshot. Normally that sonic signature would take up a large wide spread of data words. But gunshots seldom occur, so the streetlights should avoid sending such a large spread of data words un-necessarily.

The embodiments herein strive to reduce each data field independently, and then group those fields back into a main message which is sent often. Doing so can make the main message much smaller, especially with an oft-repeated baseline message, and then from there just send Delta values that vary from the baseline. This variation can be a small number depending how the number of alterations in the data occur. Sometimes the variations will incrementally increase overtime, sometimes will decrease, sometimes they'll wait around a certain value, sometimes they don't change it all, where they are pretty much set for the entire mission, and sometimes they're all over the board.

To address these issues requires discussing semiotics for a brief period. Semiotics deals with the function of those of signs and symbols in both artificially constructed and natural languages and comprises syntactics, semantics, and pragmatics. For example, one aspect of semiotics includes the study of languages and how humans communicate. Encoding, in semiotics, is the process of creating a message for transmission by an addresser to an addressee. The complementary process—interpreting a message received from an addresser—is called decoding.

Semiotic Digital Encoding (SDE) is an algorithmic approach that uses a completely new paradigm for reducing the number of bytes required to send data between entities such as ground stations and unmanned vehicles or between manned and unmanned platforms. In fact, an SDE communications scheme can be completely independent of the type of platform (manned or unmanned) or type of network being used. The fact that it is lossless means that this algorithm can be used on both new and legacy systems. Another side effect of this new scheme is that the encoding process is also inherently secure. Once certified this will allow bandwidth to be further reduced by removing the overhead associated with encryption from the data stream.

To make the embodiments herein work for communications between non-human entities, a method had to be found to preserve that context/structure that was non-semantic. The solution was to use the context inherent in structure provided in the messages themselves. That context, which is a permanent artifact of structured messaging standards such as STANAG4586 and JAUS, is separated from the changing data that those permanent elements contain. In this way the permanent elements can be shared beforehand in the form of software keys or 'playbooks' which, when added to the changing data elements, represent a full message representation that meets current military communications interoperability standards (IOP's).

The SDE embodiments described herein contain several functions, including but not limited to the following:
- A "select message set" function, which selects which message set to use.
- An "encode" function, which takes the raw message and outputs the SDE encoded message.
- A "decode" function, which takes the SDE message and outputs the reconstructed raw message and possibly an optional SDE acknowledgement message.

The SDE products described herein utilize conceptual graph structures to map out and efficiently encode a structured message into a compact bit stream that removes unneeded information bits. Structured field values are dynamically examined and repackaged into smaller byte counts depending on the delta from the expected value. This takes advantage of the fact that much of the control data is static, fluctuates within a limited range, and increments and/or decrements slowly. In the future if other data fields that contain a limited enumerated set of values are experienced when implementing the algorithm, it may be more efficient at times to send just the bits used. This can be decided on a case-by-case basis.

In an embodiment, the encoding process uses a code embedded conceptual graph structure to process each field using the encode and decode functions mentioned above.

Various of the embodiments herein operate simply as a system-transparent software monitor that watches messages coming across the network to the transmitter and replaces them with encoded versions pulled from a library. However, the encoder can be implemented as a separate hardware box so that legacy software is not disturbed in any way.

Either way, an SDE module (hardware or software) must be present at both the transmitting and receiving ends to allow for encoding and decoding of the original messages to/from the SDE format. That format is simply a bit stream of ones and zeros that tell the keys containing the permanent structure supplied by the standard being used how to reconstruct the message into the format required by legacy systems.

Further, a set of software libraries for multiple communications standards are located on a single chip that can be easily inserted into a communications stream in front of radios on ground stations and platforms. When communications are initiated between the ground and an air platform, or between two air platforms, an initial handshaking message identifies which language (standard) each is speaking, thereby setting up the communications between the entities from that point forward. This enables the SDE embodiments described herein to act as a universal translator for multiple platforms across the services. Maintenance would only require libraries to be modified and uploaded when the communications standards themselves are changed.

The embodiments herein create a knowledge-handling software toolkit from existing tools that develop and edit conceptual graphs. Various of the tools herein will convert these graphs into either the Conceptual Graph Interchange Format or CXML. Both of these formats are part of the International Standards Organization (ISO) new standard for Common Logic (CL) number 24707 that is designed to standardize formats for sharing knowledge.

Conceptual graphs represent a complete first order predicate logic system and can therefore be 'processed' in ways that make cognitive decision aiding or contextual knowledge understanding possible. To achieve this goal requires processing "cognitive" knowledge, as discussed with respect to FIGS. 2A-2E. A state table translator encodes the knowledge in the conceptual graphs into ones and zeros for secure ultra low bandwidth transmission between systems. An observer module that decodes the state tables back into representational knowledge for the receiver.

While numerous non-military applications exist, the embodiments herein take advantage of the fact that many military communications are permanently structured in some way. This structure is usually documented as part of a communications standard that is used by anyone that wants to communicate using a military system. This standardized (permanent) structure makes up the bulk of the information that is communicated between the sender and receiver. Once that permanent structure is understood by both parties it can be removed from the communications stream, leaving only the changing data elements themselves to be transmitted. The receiver can add that data with the permanent context of the message on the receiving end to gain a full lossless representation of the original communication.

Conceptual Graphs (CGs) have a foundation in logic representation, and also have first-order and predicate logic operations defined, allowing for inference and theorem proving procedures. Visually, a Conceptual Graph (CG) mimics the knowledge representation ability of diagrams used in discussions using whiteboards, slides, and on the backs of napkins. As shown in FIGS. 2A-2E, the CGs are often text snippets, typically enclosed in squares or ovals and lines (possibly with a label) connecting one text snippet to another. Experts often use these visual aids to quickly and effectively communicate complicated, technical details during brainstorming sessions, a feature that makes them a good candidate for use by systems in sharing knowledge. In CGs, text snippets are called Concepts, and line connections are called Conceptual Relations. A Concept may also contain another CG to provide contextual or nested information.

Figure 2A:
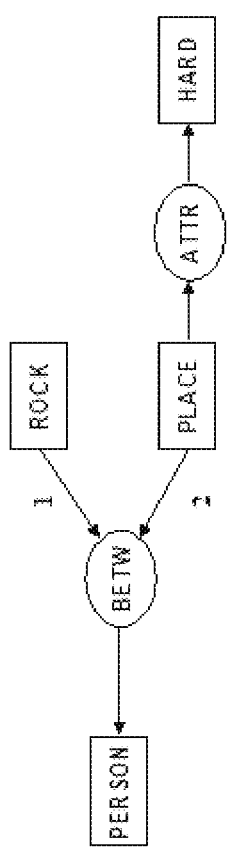
FIGS. 2A, 2B, 2C, 2D, and 2E show conceptual graphs.

For example, the conceptual graph to describe the situation that a person (concept) is between a rock (concept) and a hard (modifying concept) place (concept) would be represented as shown in FIG. 2A. Although the example shown in FIG. 2A is intentionally simple, it still demonstrates how the extremely complex logic streams and systems designs needed for processing cognitive knowledge can be developed graphically using conceptual graphs (CGs).

Figure 2B:
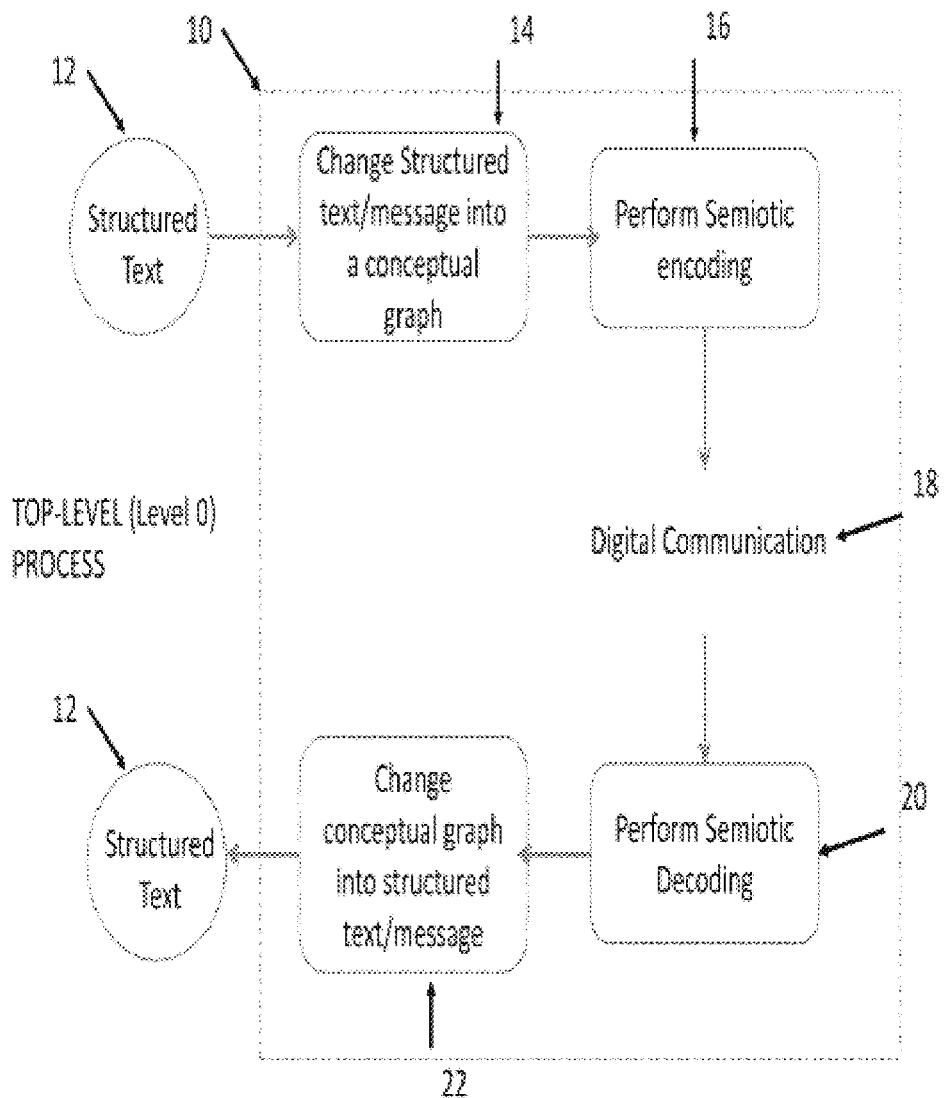
Figure 2C:
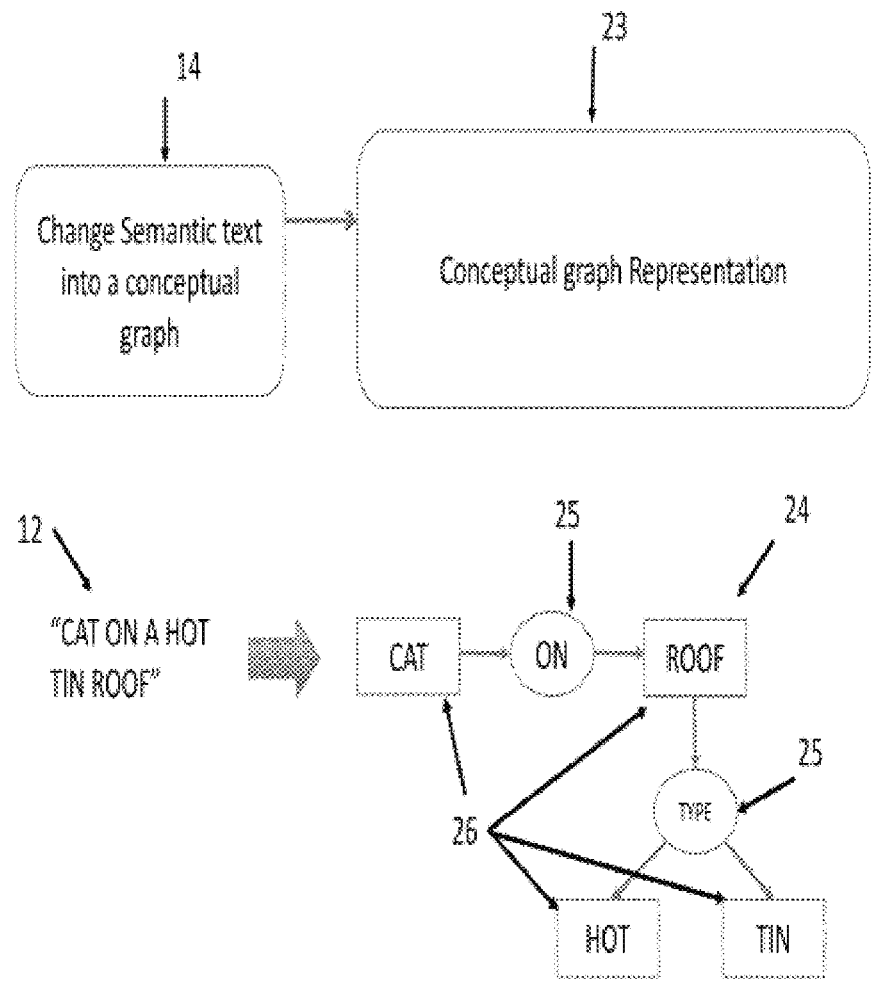
Figure 2D:
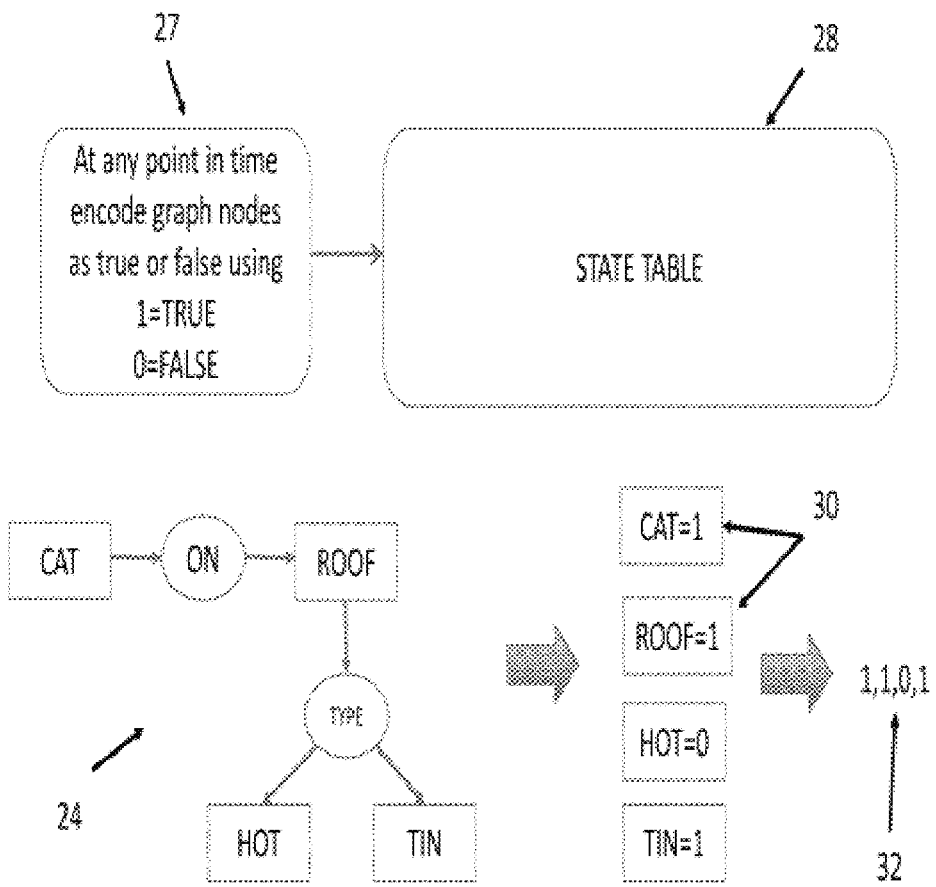

Referring now generally to FIGS. 2B-2D, one embodiment provides a system and method made used for semiotic digital encoding decoding and transfer and is generally designated by the numeral 10. Referring now to FIG. 2B, the system 10 starts with structured text 12. This structured text can be a text or message as desired, including complete sentences and normal expressions. The system 10 starts by converting the structured text 12 into a conceptual graph representation 24 at step 14, and as further describe below.

Next, the system 10 performs a semiotic encoding of the structured text 12 by converting the structured text 12 into easily transferable data, such as machine code, as compiled in a state transition table 28, or simply state table 28. As further described below, the state table 28 includes individual values 30 for the portions of the structured text 12 that can easily be transferred via a low bandwidth system. Next, the system 10 allows communication of the state table 28 by a communication step 34 to a receiver having the conceptual graph representation 24. The receiver then uses the state table 28 to complete the conceptual graph representation 24 to extract the meaning of the original structured text 12.

FIG. 2C shows an example of more detail of a preferred embodiment of the conversion step 14 of the system 10. In this step, a conceptual graph representation 24 is formed from the structured text 12 at step 23. This formation can be contemporaneous to some of the other steps of the system, for example in the step of the creation of the state table 28, or the formation 23 of the conceptual graph representation 24 can preferably be created in advance. The conceptual graph representation 24 can take various form that can help establish the concept of the structured text 12 that is being transfer and communicated. For example, the conceptual graph representation 24 can use syntax to establish the generally grammatical form of the message being delivered. In FIG. 2C, this is shown by the conceptual graph representation 24 with individual text fields 26 having connective fields 25 for the structured text 12.

After the conceptual graph representation 24 is established for the structured text 12, a state table 28 can be formed by step 27, as exampled in FIG. 2D, which shows an example of more detail of the formation of a state table 28. In this step 27, for a given point in time an encoded graph nodes 30, or individual values 30, are given values base on true or false values: 1=true and 0=false. The encoded graph nodes 30 match up to the individual text fields 26 of the conceptual graph representation 24. This creates the state table 28 as exampled by the graph node output 32.

Figure 2E:
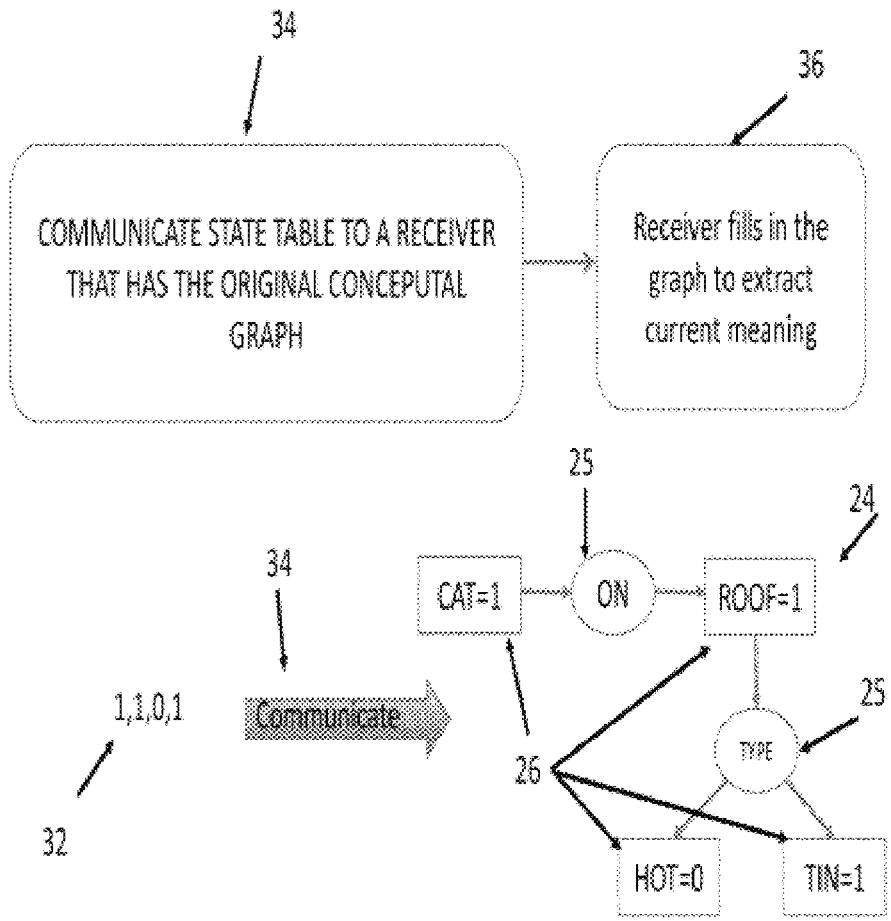

As seen in FIG. 2E, once the state table 28 and graph node output 32 are established, the state table 28, and the graph node output 32, can be efficiently transferred/communicated in step 34 over a low bandwidth system. At the other end of the transmission, a user/receiver can receive the state table 28 and graph node output 32. That receiver will have the original conceptual graph representation 24 and then will begin recreate the conceptual graph representation 24 in step 36. The receiver will use the graph node output 32 to fill the individual text fields 26 of the conceptual graph representation 24 to recreate the original structured text 12. In this manner the message can be known to the receiver.

In the embodiments herein, preferably, and in some instances necessarily, the starting point is the structured message/text 12 that establishes the relative positions of each word or piece of information. This facilitates the structure of the message and allows the binary nature of the transferred data to carry the desired message. Further, the receiving entity should have the same conceptual graph representation 24 as the sending entity to allow for the proper decoding. Further, knowing the transmission order of the graph node output 32 can be important to allow the receiver to reconstruct the conceptual graph representation 24 from the state table 28. Since the receiver has the knowledge of the relationship of state table 28 to the conceptual graph representation 24 created from the original structured text 12, the receiver is able to reconstruct the original structured text 12.

The embodiments herein have many benefits. This can include the fact that the digital state table requires less bandwidth for transmission that typical ASCII transmissions. Further, this system and method is inherently secure. In order to reconstruct the structured text 12, anyone intercepting the communication would have to know both the conceptual graph representation 24 and the order of transmission of the elements of the state table 28. Thus, the system and methods described herein can be used to efficiently and securely transfer data.

In addition to their ability to visualize knowledge, CGs have many advantages over other classic logic processing systems such as neural networks, Bayesian networks, inferencing, etc. including:
The system is graphical, which allows information to be translated into understanding in the mind of the human much more quickly.
The graphs are semantic (human language), which allows for better understanding of complex concepts.
The graphs are easily manipulated/modified using COTS/GOTS (Commercially Off The Shelf/Government Off the Shelf) tools.
As a parallel, object-oriented schema, the representation is completely non-brittle, allowing analysts to easily change logical connections in the graph as things change, without completely re-doing the graphs.
The number of states that can be defined in a conceptual graph go as $2^N$ where N is the number of nodes in the graph. That means that with a graph with as little as 10 nodes, 1028 separate decision states can be defined in only 10 bytes.

Through the use of conceptual graphs as a schema for handling cognitive knowledge, the embodiments herein overcome the limitations imposed by older approaches and provide a stable, easy-to-use baseline for the creation of an automated knowledge capture, storage and processing environment to share secure communications at ultra-low bandwidths.

Within the embodiments herein, expert knowledge is input directly into the toolkit by SMEs or analysts in graphical form by dragging icons down onto the screen. The icons are then connected by the user into logical sequences. The toolkit automatically generates the ISO standard or XML. A specially designed parser turns this standard language into executable conceptual graphs that can be stored as objects, XML streams, or text files.

Although any structured messages or data can be encoded using the embodiments herein, for illustration and example within this disclosure, the message sets commonly used for command and control of unmanned assets within the DOD will be used, specifically the STANAG4586 and JAUS message sets. The encoding process does not care if the data being encoded contains C2 messages or payload data. As long as those messages are structured in some way, the embodiments herein can be applied. This means, however that raw payload data, such as video data is not a good candidate for the encoding process because this data is usually sent as an unstructured bit stream.

To illustrate how the SDE encoding process is accomplished, the STANAG4586 message set is used, although JAUS messages are encoded much the same way. FIG. 3A shows an example of the STANAG4586 C2 message ID number 3003 (Mode Preference Report). This example shows that structured messages come as a collection of pre-defined fields that specify the length, format and precision of each field element.

Figure 3B:
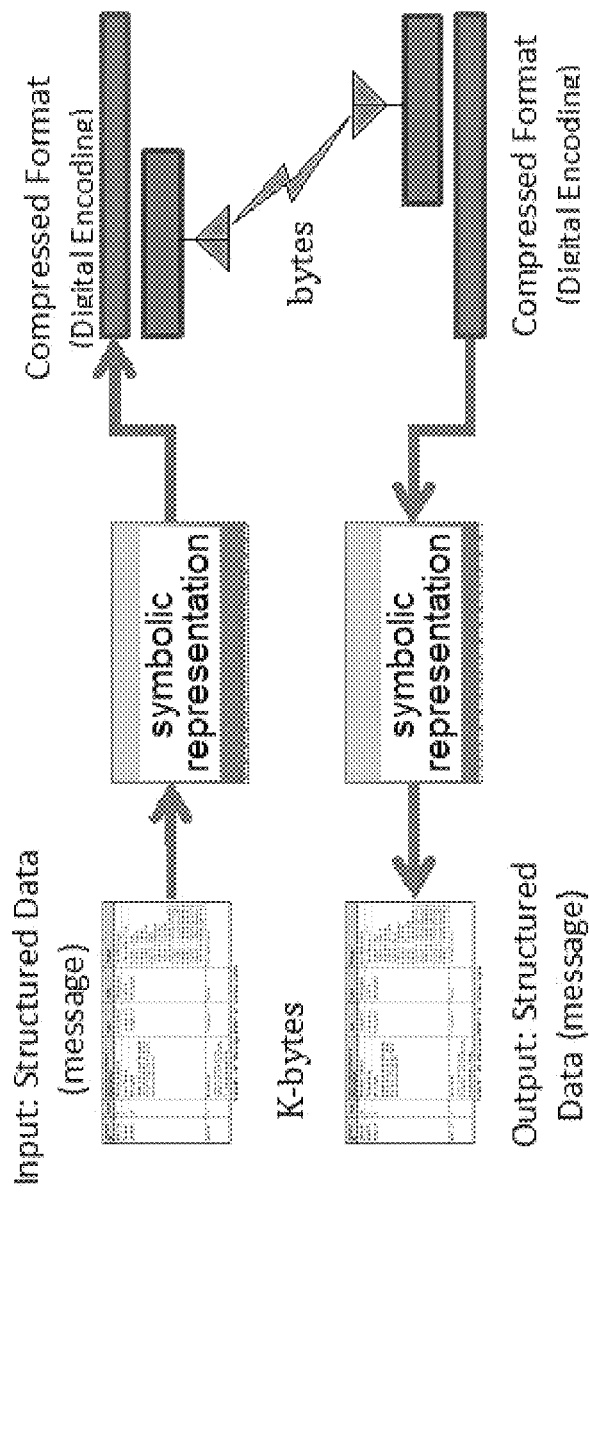
FIG. 3B shows an embodiment of a Semiotic Digital Encoding (SDE) processes described herein acting on the structured message of FIG. 3A.

Using the structured definition from FIG. 3A, an example SDE system 10 shown in FIG. 3B effectively separates the permanent structured context of the message from the actual data being transmitted. The permanent context becomes a key that allows the full original message to be reconstructed without any loss on the receiving end. Normally, to ensure that the communications are secure, these keys would have to be protected. However, without knowing the order of the bits in the transmitted data it would be extremely difficult to decode the message meaning. Therefore by periodically changing the byte order of the transmitted data, full communications security is achieved.

Figure 4A:
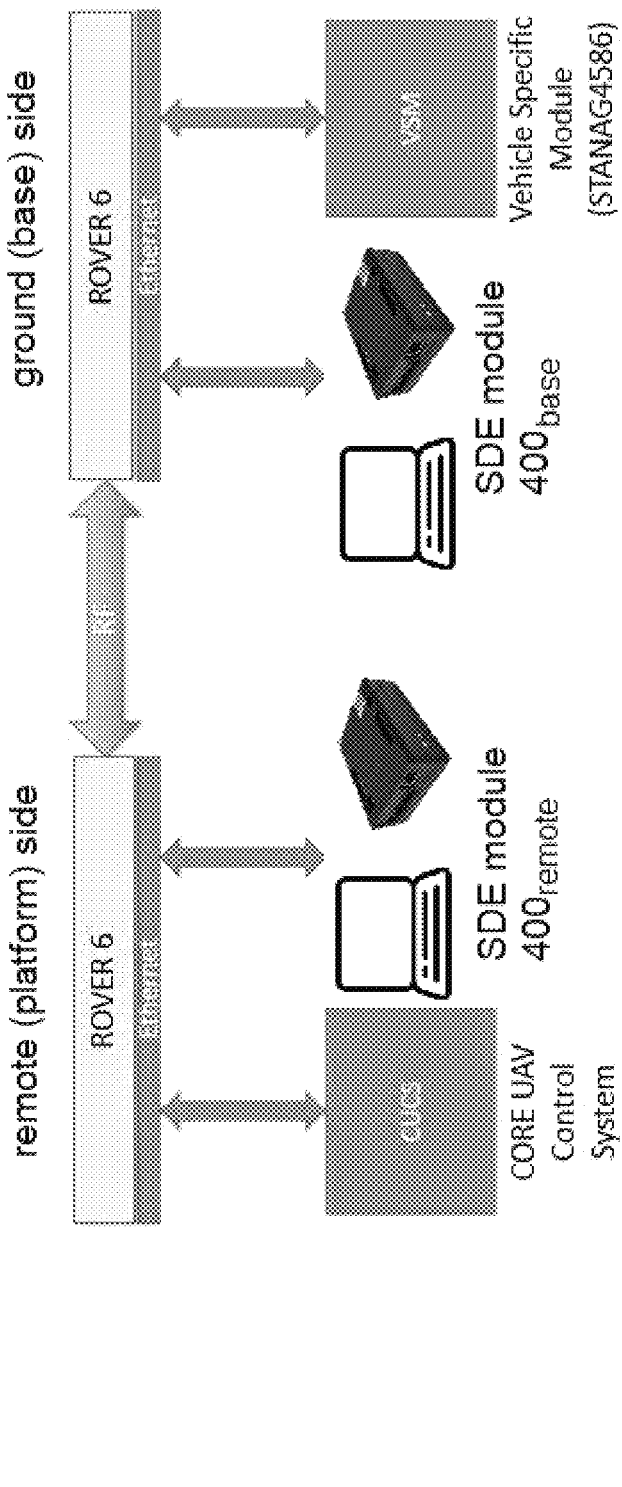
FIG. 4A shows potential hardware implementations clarifying the embodiment of FIG. 3B.

FIG. 3B illustrates how Semiotic Digital Encoding works by symbolically encoding the permanent parts of structured data standards, using the elements of FIG. 3A as an example. Only those data elements within FIG. 3A that change are then transmitted, and added back to the permanent context again at the receiving end without any loss. Next, FIG. 4A shows potential hardware implementations of the SDE system 10, clarifying the embodiment of FIG. 3B, showing how the SDE modules 400 can comprise, in an embodiment, a laptop and a router. In FIG. 4A, the specific SDE hardware modules $400_{base}$ and $400_{remote}$ look the same, but that is merely an example and the embodiments herein are not limited as such.

As mentioned previously the SDE library creation process essentially separates the context contained in a structured message from the knowledge that resides within that structure. The first step in this process is therefore to decompose each structured message in a NIOP standard such as STANAG4586 into a symbolic representation of itself using conceptual graphs. This is a manually intensive process as each field in the message is represented by a separate concept node. Also, every message graph will be different. Depending on how much information is contained in a message's fields, these representations can be small and simple or large and complex.

Figure 5:
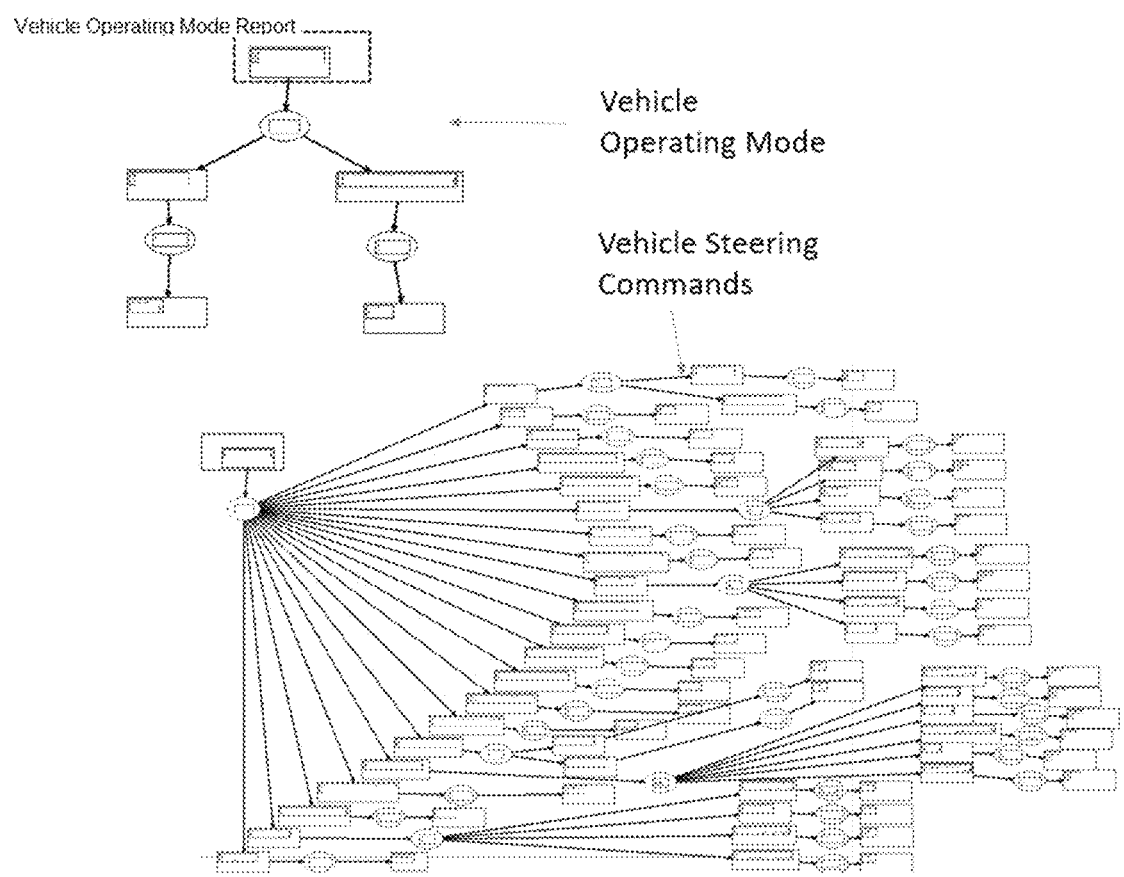
FIG. 5 are examples of simple and complex graphical representations created for different STANAG messages.

An example of actual graphical representations for separate STANAG4586 messages are shown in FIG. 5. Within FIGS. 5, 6, 7 and 8B, the various shapes e.g. (oval, rectangle, square, circle) represent types of message-contents, e.g. data, instructions, positions, status or other. For simplicity and ease of understanding, almost all text identifiers and markings associated with the shapes within FIGS. 5, 6, 7 and 8B are removed, except for a small portion of FIG. 7. This removal is first because the markings would be so small they would be impossible to read, and second, because FIGS. 5, 6, 7 and 8B are meant to convey principles of the invention using shapes and visual comparisons, such that specific data or instructions are not needed.

Figure 6:
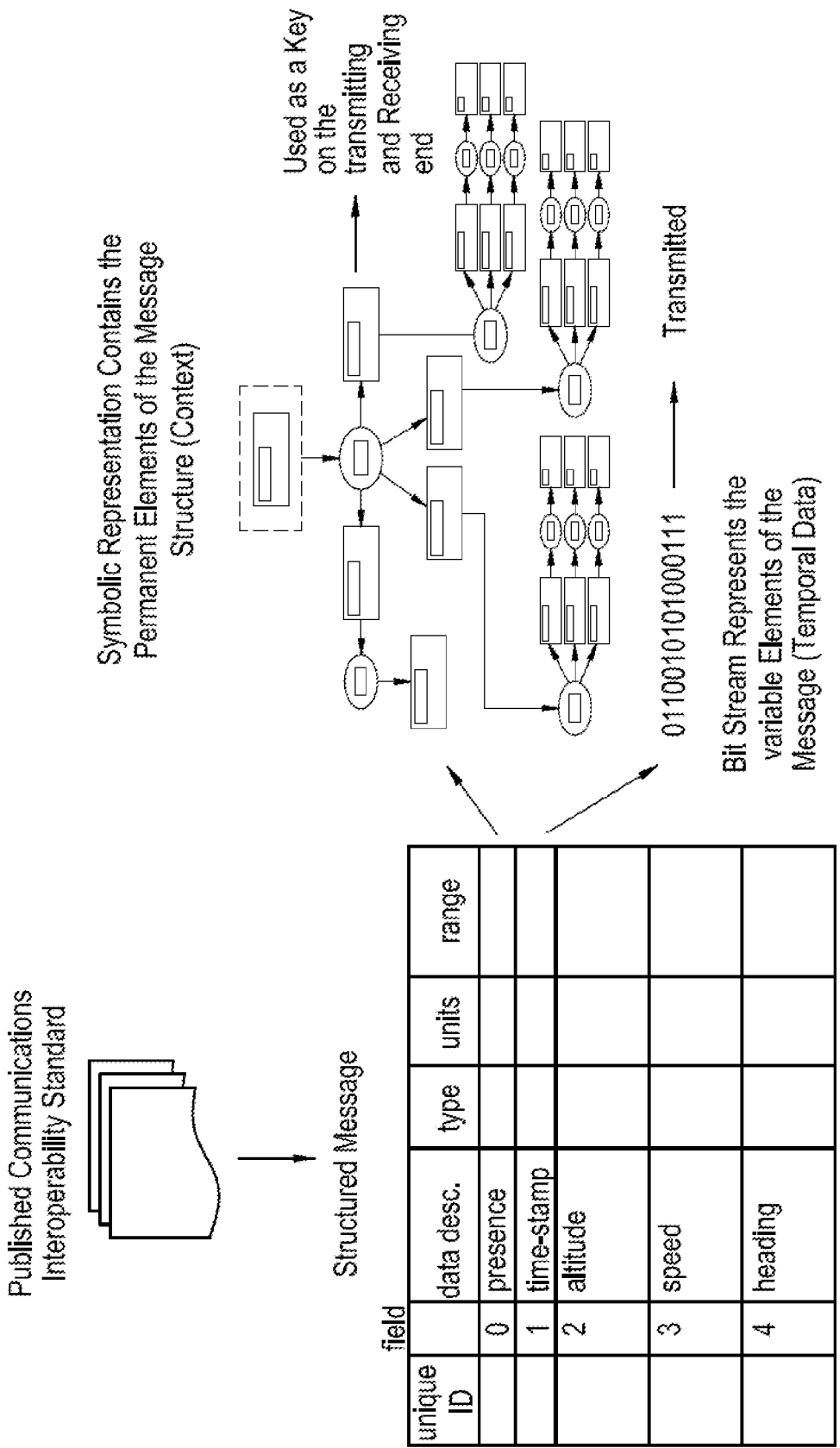
FIG. 6 shows an example SDE encoding process separating a permanent structure of a message from the temporal data contained therein.
Figure 7:
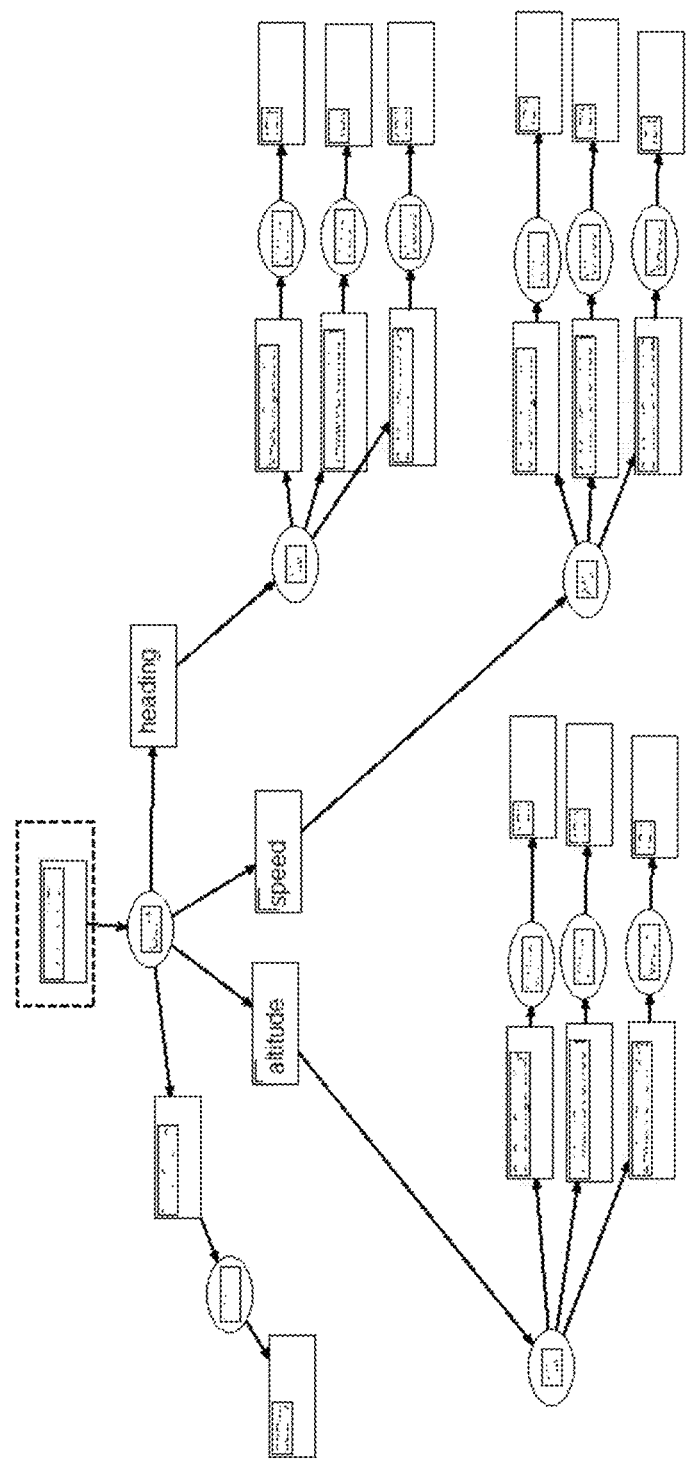
FIG. 7 shows a conceptual graph (symbolic) representation of the structured (permanent) part of the STANAG message shown in FIG. 6.
Figure 8A:
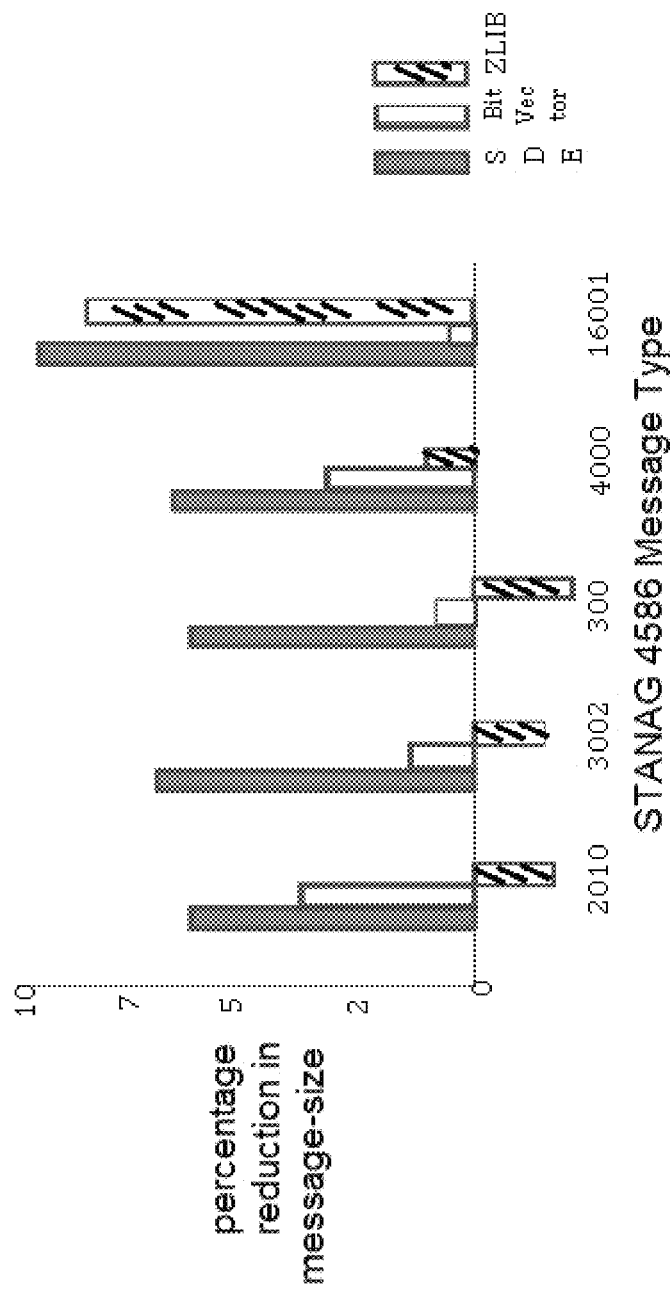
FIG. 8A shows data for an assortment of STANAG messages using the embodiments herein, showing significantly reduced bandwidth.
Figure 8B:
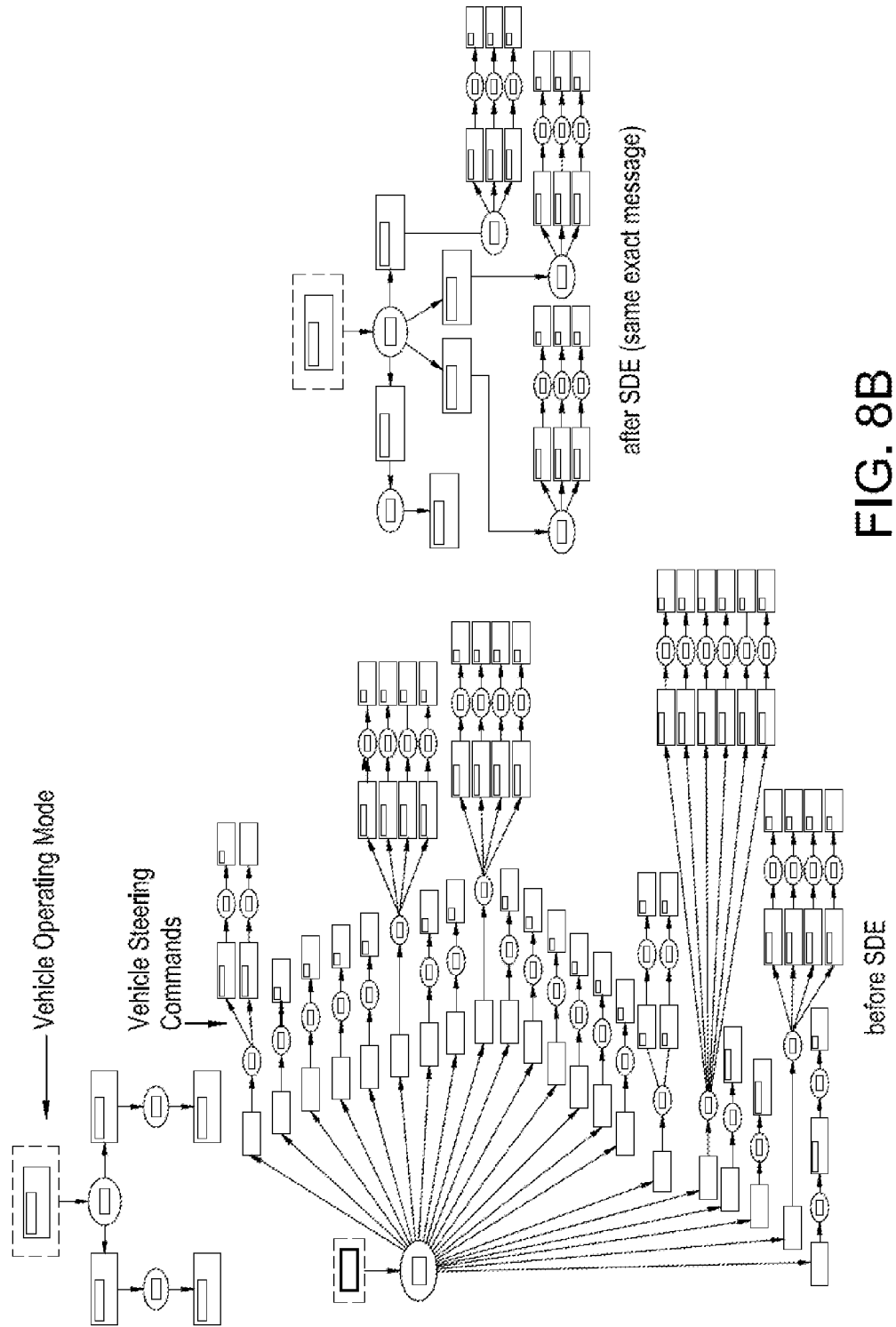
FIG. 8B shows a visual contrast of an message structure prior to use of the embodiments herein, and that same message structure after using the embodiments herein.

FIGS. 6, 7 and 8B are partly meant to convey that there exist some nodes required for the vehicle operating mode message therein that would result in the need for only a few bytes to be sent. However, in sharp contrast, FIG. 5 shows that the Vehicle Steering Command message requires a large number of nodes to represent the knowledge contained in the message. Since every STANAG4586 structured message requires up to 640 Bytes in its native mode, the fewer nodes needed to graphically (symbolically) represent the knowledge contained in the message, the more bandwidth is saved.

Using the graphical representation of the message from FIG. 5, one can now use that information to encode a bit stream based on the status and value of each node. Knowledge is encoded based on the status of each node is (i.e. true or false). Node values are encoded into the bit stream using the least number of bits to represent the value or change in value from the previous acknowledged checkpoint message. The bit stream created for transmission is simply the collection of bits representing the state of each node where one (1) is used if that node is true and a zero (0) is used if that node is false.

FIG. 6 shows this process from end to end, and FIG. 7 shows a visual arrangement of some portions of FIG. 6, including at least altitude, speed, and headings.

Figure 11:
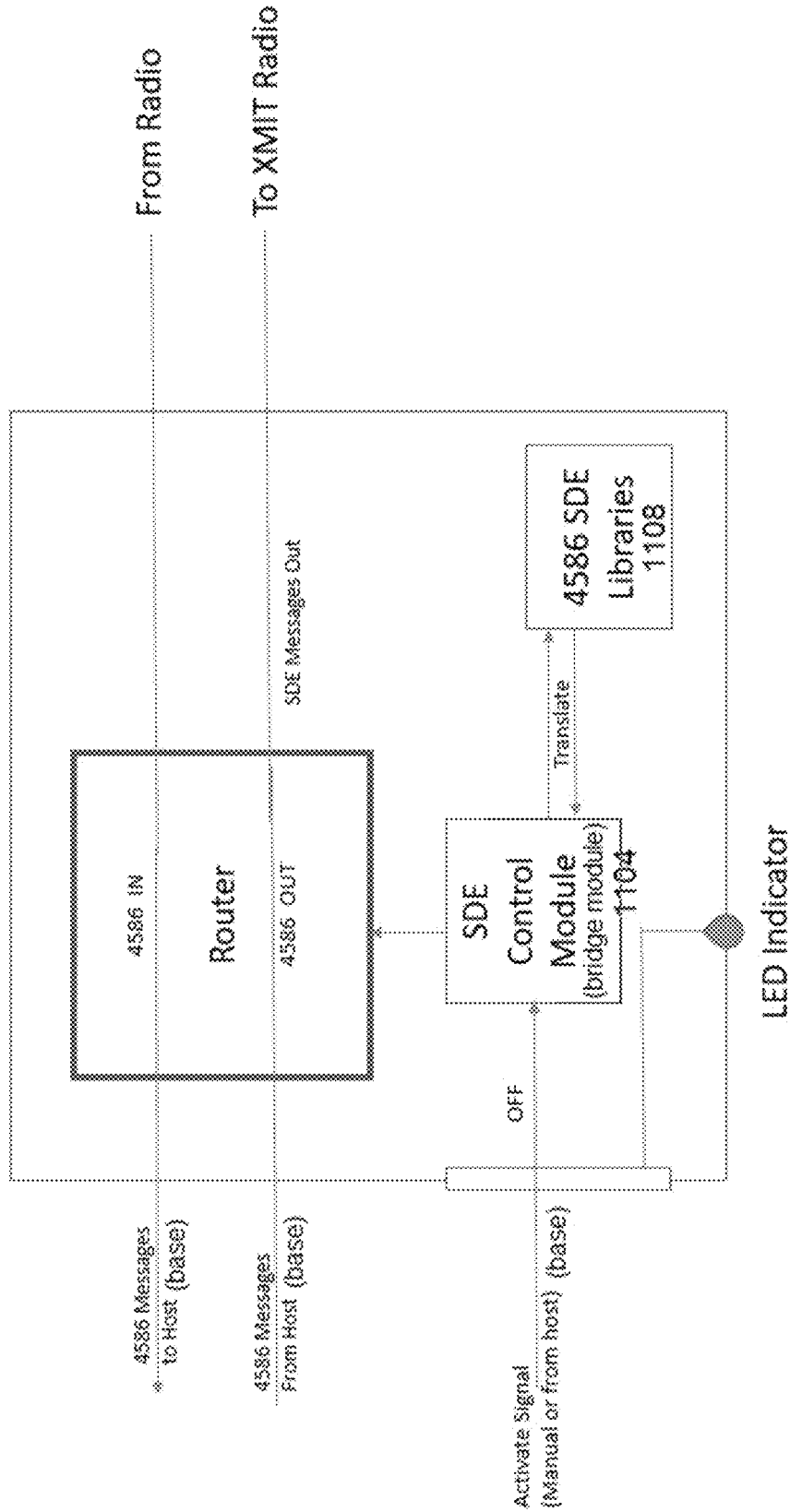
FIG. 11 shows an SDE system module design and functionality.
Figure 12:
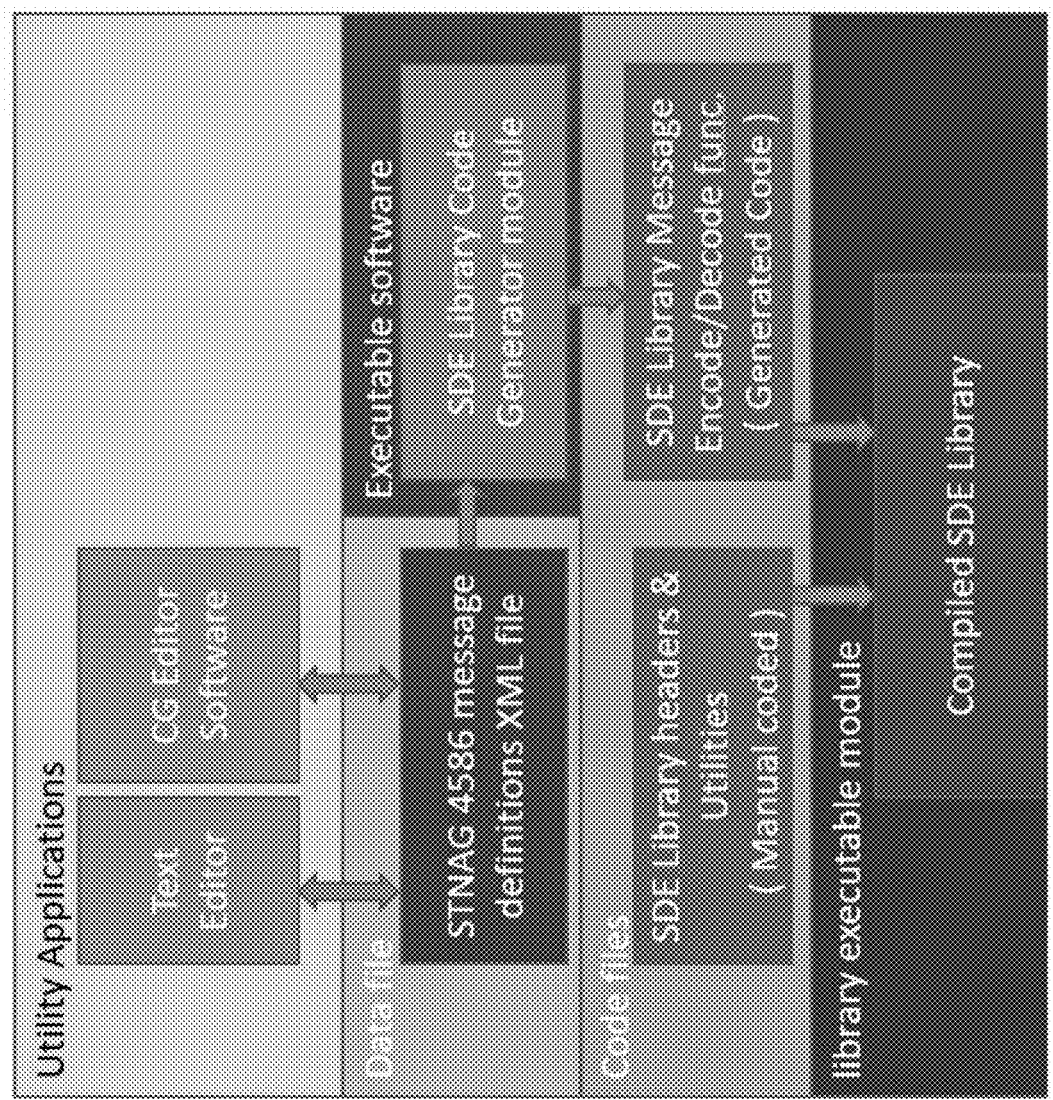
FIG. 12 shows an example SDE library generation block diagram.
Figure 13:
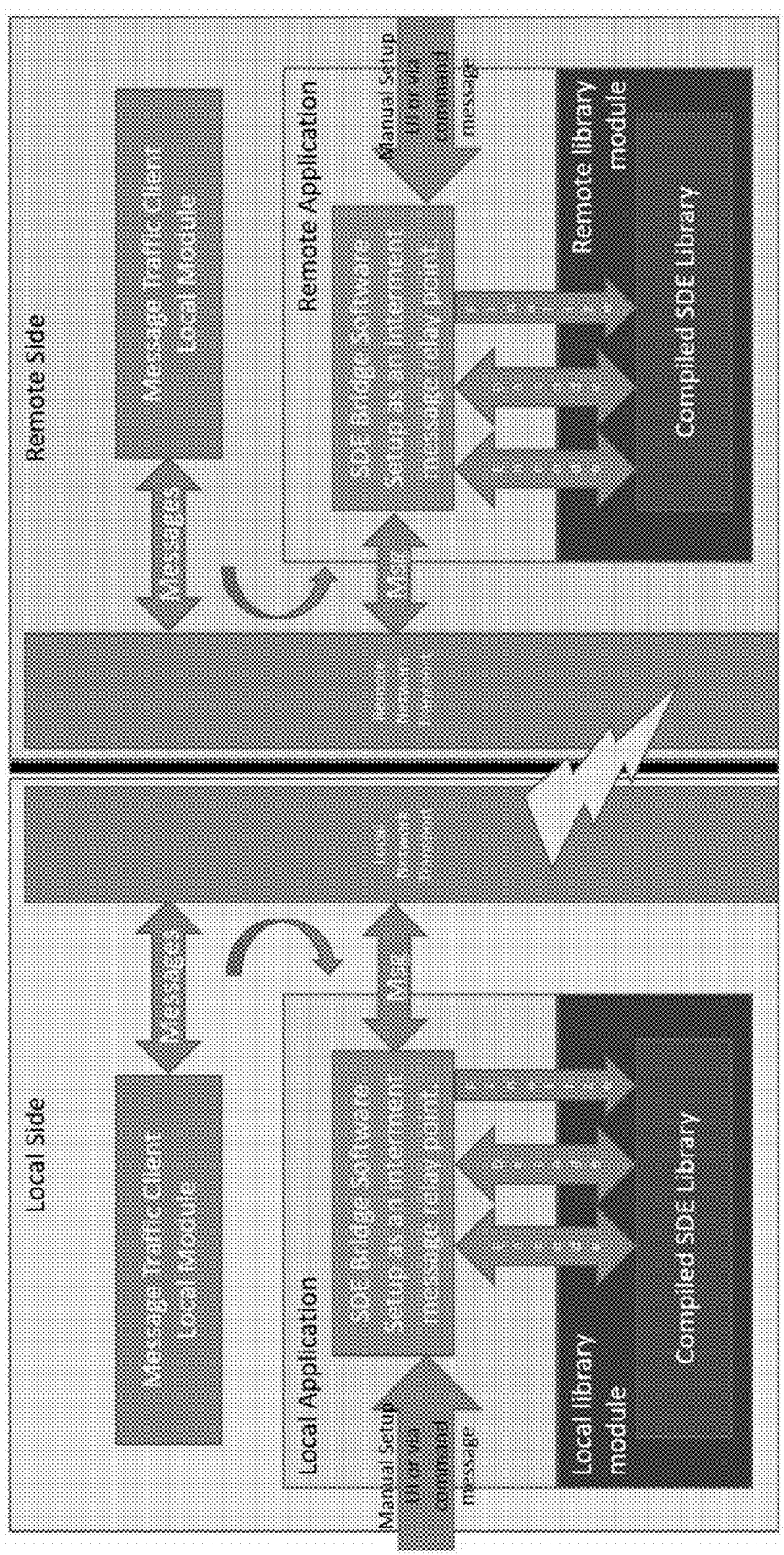
FIG. 13 shows an example SDE software block diagram.

Although the initial decomposition of the message structure (e.g. FIG. 6) into symbolic format (e.g. FIG. 7) is labor intensive, once all messages have been translated into a computer readable format, they are run through an application that generates the individual message handling code for each message structure to be stored in the SDE software library (see e.g. FIGS. 11, 12, and 13). They do not need to be changed again unless the standard itself changes. The SDE library contains the equivalent graphical key function embedded in machine code. By using the graphical key embedded library on both ends of the communications link (sender and receiver), the SDE embodiments described herein becomes what is referred to as a symmetric key algorithm. Once the bit stream that represents the knowledge contained in the message is encoded by the sender, those bits are used to fill in on the receiver's side and the process is reversed to re-create the original STANAG4586 message. In this way SDE is a completely lossless process.

In the example shown in FIG. 7, the mode attributes of Altitude, Heading and Speed would normally all be transmitted as 8 bit words. To report the status of each mode would require 24 bits. By separating out the structure, the system 10 reports each mode as a 1 if it is true and a 0 if it is false relying on the relative position in the conceptual graph to tell the receiving entity which mode is active at any point in time. This only requires 3 bits, an almost 90% reduction in that part of the size of the message on the receiving end. Because each message has a different compression ratio the total compression achieved through the encoding process depends on which messages are used and how often they are sent.

The secure nature of this process results from the fact that the bit stream of one's and zero's has no inherent meaning unless one possesses the graphical key being used. Even if an adversary had the key, changing the order of the bits being transmitted would require all combinations of bit orders to be created to decipher the message. The node preference report message from FIG. 7 contains 24 nodes, so there are $2^{24}$ different possible combinations (over 16 million). Although not impossible, to decipher the bit stream quickly becomes impractical because of the magnitude of the stream. By the time a hacker or unauthorized person de-constructed and re-constructed the stream, the information would already be stale.

FIG. 8A shows objective tests run on the bandwidth differences between the new encoding technique and two other well-known mathematical compression techniques. The results showed that SDE was several orders of magnitude more efficient than the mathematical compression techniques.

Extrapolating from FIG. 8A, the embodiments herein achieved greater than 80% reduction in bandwidth for all scenarios exercised using STANAG4586 and approximately a 50% overall reduction for JAUS. The smaller compression results for JAUS result from the fact that unlike STANAG4586, which is a message set, JAUS is actually a communications protocol over which JAUS messages are sent. For that reason JAUS messages are generally smaller to begin with, making it more difficult to achieve a reduction in size. Having said that 50% reduction is still remarkable compared to most known compression techniques commonly available today. Again, the embodiments herein do not perform compression, but are sometimes compared to compression.

FIG. 8B shows an easy, non-verbal, entirely visual comparison of how the SDE embodiments herein de-complexify a typical message.

Figure 9:
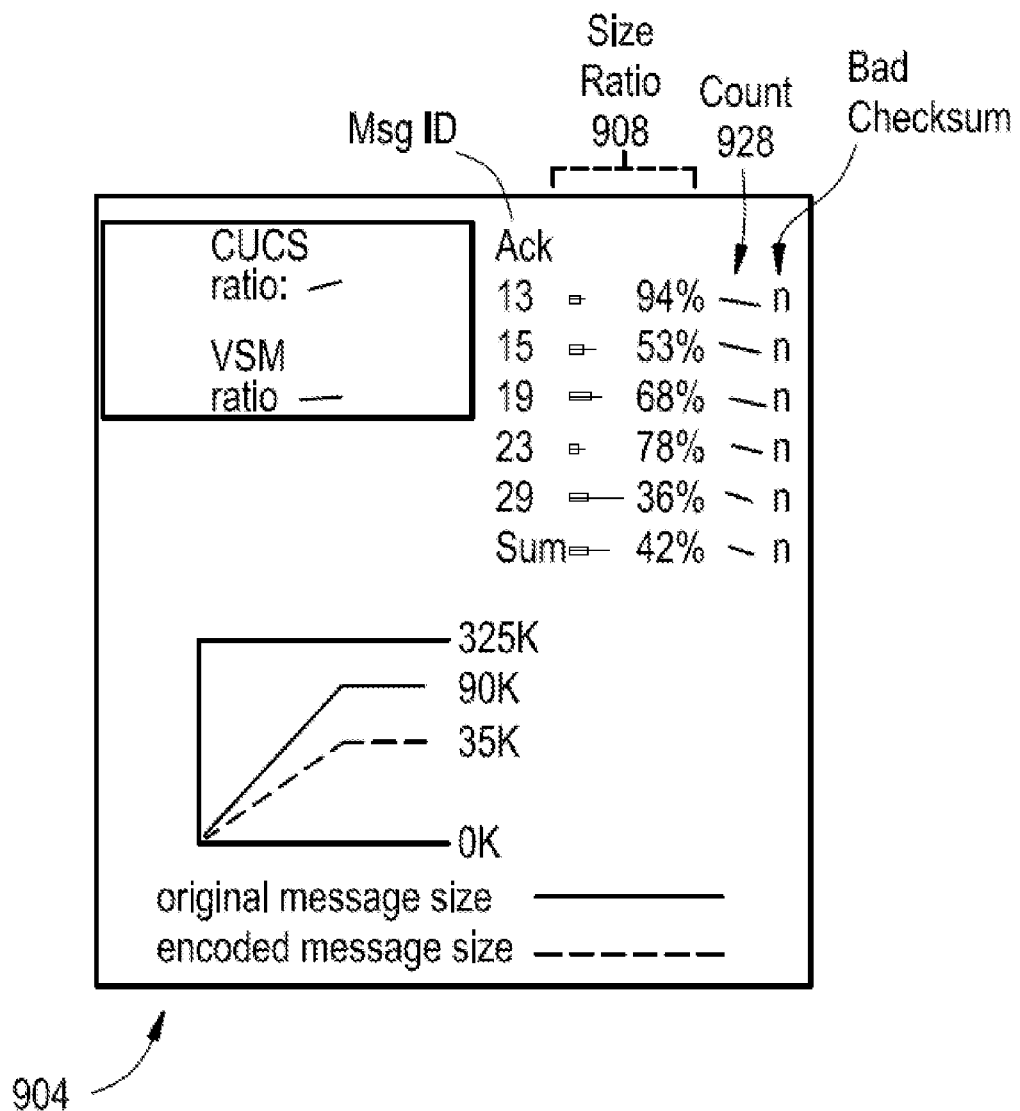
FIG. 9 shows SDE test software allowing individual or streamed SDE message sets to be timed, compared and tested.

Review of Test\Emulation GUI (FIG. 9)

The embodiments herein further comprise a software test suite that allows sending and receive both STANAG4586 and JAUS messages. As shown in FIG. 9, a dashboard 904 within the test suite allow developers to input both message types and compare SDE timing and bandwidth usage against existing standard message sets. Within FIG. 9, CUCS stands for Computer User Control System, while VSM stands for Vehicle System Management.

Within FIG. 9, the size ratios 908 of the messages are shown in the form of <somewhat> hot dog and bun shapes. These are explained as follows. The small bar (hot dog) in the middle is the original size (meat) of a message. The surrounding (bun) part is how much that message was reduced to. The "count" field 928 shows an example number of messages of that type which have been sent. From FIG. 9A it is apparent that a 42% reduction in message size has been achieved, completely lossless, without compression.

Additionally, the SDE embodiments perform pre-processing on the various messages, including having the ability to convert from one type to another type, e.g. fixed integer to float. The SDE system 10 thus permits conversion from a float to a fixed integer of that size, and then back, with relatively little loss.

The embodiments herein separate out the structured and unstructured parts of a communications stream. The major difference between structured messages and image-based payload data is that many times the payload data is transmitted in a raw or semi-structured format. There are exceptions, however. Even raw imagery data contains structure that can be encoded using the semiotic digital encoding (SDE) techniques described herein, of which the SDE system 10 is but one example. Each data point in a raw imagery data stream contains context that identifies its location relative to other data points and its relative intensity and point in time (for video).

For example, to save time and bandwidth, payload data is sometimes pre-processed on the sensing platform before it is transmitted to the ground, using an imagery standard such as RS170, RGB or SMPTE-294M. In these cases, like the STANAG4586 and JAUS standards encoded with C2 messages, the embodiments herein can be configured to an identical approach, but only minimal compression gains would be realized.

Problem Solving, Error Correction, Debugging, Error Recovery

There are scenarios in which the sending/receiving SDE modules 400 can have trouble, problems, battery failure, transmission problems, gun shots, bullet impact, or need to be rebooted. All of these conditions have in common that the two modules $400_{base}$ and $400_{remote}$ can get out of sync. Now suppose, at that same instant, a transmission said "lets change from float to fixed-integer". A problem could occur where the receiving SDE module 400 on the other side could say "what? you didn't tell me you went from fixed integer to float". If one side forgets the agreed-upon face value of the message which can happen say, need to reboot it for whatever reason, there is still a part of the header that says " . . . sending this message type using agreed-upon ID number". This in turn assists in error-recovery.

Another condition is where an SDE module 400 sends back acknowledge saying that SDE module 400A is going to sync signal to SDE module 400B, so send a regular message. If everything goes properly, the next message that comes through will be reset to be the total values, with no deltas involved, thus taking a temporary break from the SDE system 10 described herein. SDE module 400B will ask to re-sync at that time. The remote side (e.g. SDE module 400A) will then say "yes, I received that message" and once the original side (e.g. SDE module 400B) gets the acknowledge, it starts using that base value at that point.

As such, an adverse party would have to possess a certain key, which is easily reconfigurable and would not be the same key for all implementations of the embodiments herein.

Each SDE module 400 would differ and be individually configurable to be set up with a key, either as part of the communication link either on the radio that's communicating between the two devices, or a key that is added as another layer in the software libraries (described in more detailed elsewhere herein).

Design Specs

This following sections discuss and illustrated some potential non-limiting hardware and software design specifications for the embodiments of the SDE system 10. The software design specification (e.g. FIGS. 12-13) describes the software structure, functions and intended operational modes of the SDE system 10. Meanwhile, the hardware design section (e.g. FIGS. 11, 14-16) presents a draft design for a potential, non-limiting hardware implementation of the SDE system 10.

For purposes of example, the following example hardware and software designs will illustrate digitally encoding and decoding a NATO Standardization Agreement (STANAG) 4586 message set, as a way of providing a specific example implementation of that process. The 4586 message set was developed to be an open standard for interoperable communications between ground stations and unmanned air vehicles. As a standard, the STANAG messages are considered to be "structured messages" because their size, structure, fields, content, etc. are pre-defined.

Figure 10:
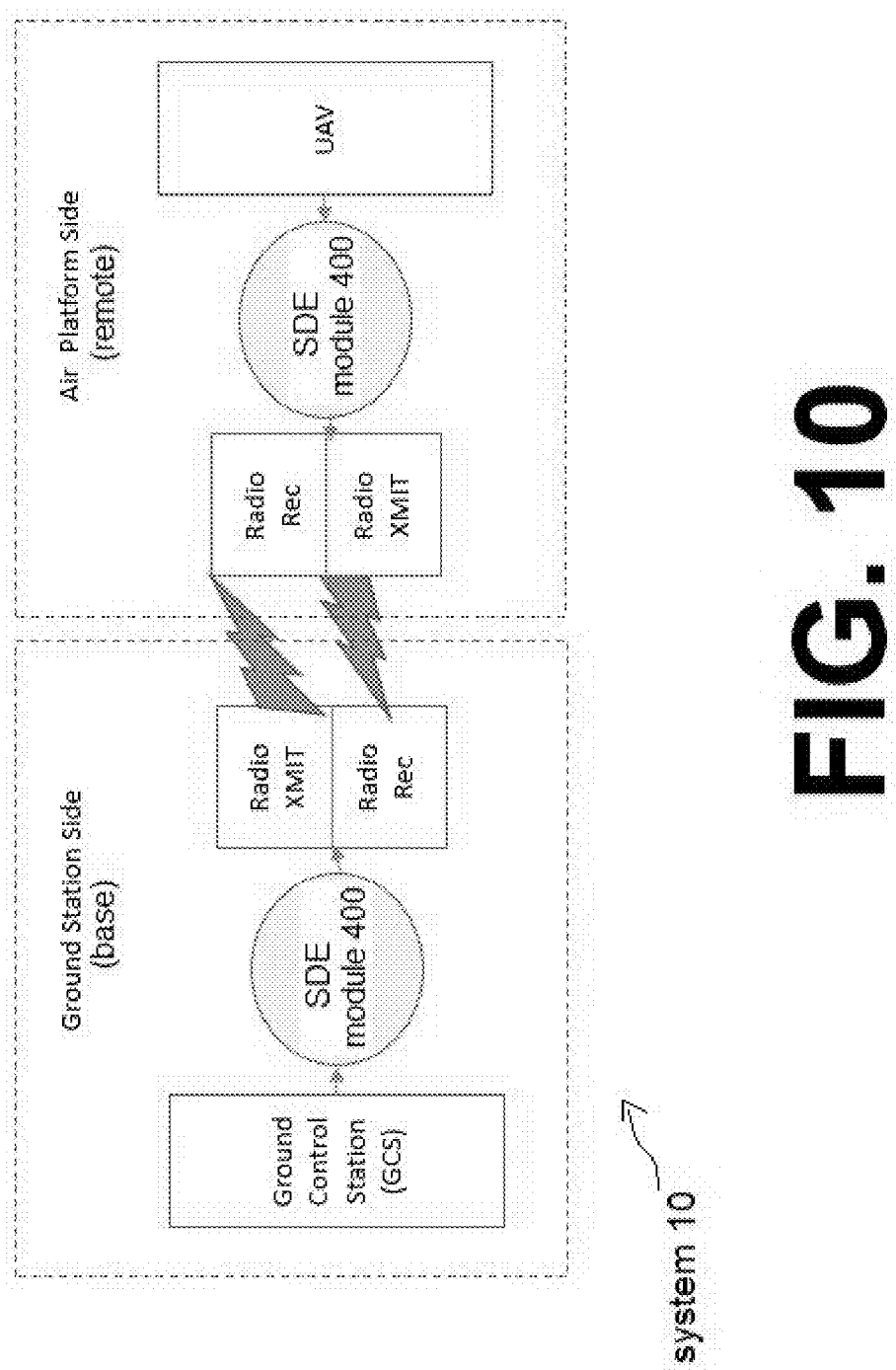
FIG. 10 shows an example SDE module employed in an unmanned systems control scenario.

Before moving to the examples however, it is important to note that this specification details both non-limiting example hardware and software designs that could be used to build a specific implementation of a product that could be implemented within existing software, or built as a stand-alone hardware implementation for legacy systems or systems where a straight software implementation is not feasible or desired. These designs are for illustration and example only, so that the embodiments herein should not be considered as limited exclusively thereto FIG. 10 shows an overview of how the system will be used to process structured command and control messages using an example of unmanned vehicle control. As stated, the SDE principles described herein, including but not limited to the SDE system 10, can be used in a variety of other contexts not related to unmanned vehicle control. In this context the "system" refers to the SDE module itself and not the other associated elements shown in the FIG. 10. Note that the physical configuration of the SDE unit can be different depending on the requirements of the host platform or system to which it is connected. For example, in an unmanned system control system, the size, weight, form factor, and power for a particular SDE module on the air platform side are all going to be of paramount importance, whereas those factors are probably not important on the ground station side. Thus, even though the physical parameters of the paired SDE modules may be different, their functionality will be identical.

As shown in FIG. 11, the function of an SDE module 400 in the "OFF" mode is to allow outgoing STANAG4586 messages from the local base to continue through the router to their original IP address and to allow incoming STANAG 4586 messages from a remote host to pass through the router to their original address. Conversely, the function of an SDE module 400 in the "ON" mode is to intercept the outgoing STANAG 4586 messages and replace them with encoded SDE compressed format and to intercept SDE message format from an outside host system and encode those messages into STANAG 4586 messages before they are delivered to their original addressed recipients.

Within the embodiments herein, there exist at least three configurations in which the SDE software can be implemented, as follows:
- LIBRARY ONLY: In this configuration, only the library of encoded messages is supplies and the host is responsible for monitoring message traffic and retrieving the corresponding message from the library.
- FULL SOFTWARE IMPLEMENTATION: In this configuration, only a start/stop signal is required from the host. The bridge module then handles the tasks of monitoring message traffic and retrieving the corresponding message from the library.
- HARDWARE IMPLEMENTATION: The hardware implementation hosts the full SDE software in a separate box that is physically inserted between the message generator and the radio on either or both ends.

Note that these implementations can be mixed. For example, a LIBRARY ONLY implementation on the ground side can work with a HARDWARE implementation on the platform side.

To implement SDE as a software function within an existing processor (either on the ground or platform side) it is assumed that enough spare memory and processing power exists to implement the software and that the necessary signals to start/stop that function can be added. It is also assumed that STANAG4586 messages from the host system can be re-routed to the SDE module and that a small amount of latency in the final transmission of the encoded digital stream is acceptable.

If implemented as a "plug-in" software function that is inserted between a ground station output and a radio on the ground (local) side and between the radio and navigation and control unit on the UAV (remote) side, the SDE functionality can either be constantly encoding/decoding signals or turned on/off using software logic built into the existing transmitting/receiving software modules.

Once initiated, the SDE software module reads each structured message being transmitted and compares that message to its library of e.g. STANAG4586 messages. If the message is found in the library, it is replaced with the encoded format. If it is not found, the original message is released to be transmitted in its original format. On the receiving side a similar process reads each message, recognizes those that are in the known encoded format, and decodes them and passes un-encoded messages without interference.

The SDE library contains the encoded forms of all existing STANAG4586 messages. Other types of encoded messages can also be added to the library or separate libraries based upon functional message types.

The SDE software comprises the interface bridge module 1104 and library module 1108. The SDE library module 1108 is a procedurally generated code utility for converting a fixed stream message format such as STANAG-4586 into an encoded stream message. SDE encoding takes advantage of the knowledge inherent in a fixed stream message format and the reduction of redundant data to produce a smaller compact message footprint. The SDE interface bridge 1104 is an application to intercept a fixed message format stream on both sides of a communication link either being called implicitly by the message applications or by being configured as the message targeted port on both ends of a communication link. The SDE interface bridge 1104 uses the SDE library 1108 to encode and decode the messages on both ends of the communication link. The interface bridge module 1104 is a utility to retrofit communication applications that designs do not call the library module 1108 directly.

The SDE library module 1108 can be written in C, and is designed to be OS agnostic. In its simplest implementation the library module 1108 is supplied and the host handles all of the bridge functions of retrieving encoded messages from the library. Although each message library will require different amounts of memory depending on the length and complexity of the message set being encoded, the current SDE library module 1108 requires 347 kb of memory space while the SDE test bridge module 1104 requires 83 kb.

When the full implementation of library and bridge is implemented, the software only requires a single interface signal that notifies the bridge software that it should begin the encoding/decoding process.

FIG. 12 shows a block diagram of the modules required to allow BRC to generate a new library module or edit or add to an existing executable library module 1108. Once the library module is complete it can be integrated into an existing communications stream as shown in FIG. 13.

Note that if the existing BRC bridge module 1104 is used, only one interface signal is needed to start/stop the encoding process. If a base prefers to handle the replacement of STANAG4586 messages with the encoded format from the library (ground control base side) or the reconstruction of the encoded stream back into STANAG4586 messages (remote platform side), the embodiments herein can accommodate such a condition for but purposes of brevity that is not described in more detail herein.

Suggested, Non-Limiting Potential Hardware Embodiments

As shown at least within FIG. 4A, the SDE modules 400 can comprise e.g. a conventional laptop and a router in the form of e.g. a panda latte, which is a small pi laptop similar to raspberry pi, except that a panda latte is basically a Windows device rather than a Linux device. Still, there no reason to not modify it to run on Linux, or other custom hardware.

The panda latte is not a true router in the traditional sense, but is being used as a router for illustration purposes within this disclosure. The key principle is to run the SDE embodiments on a small device configuration that does not go out of the production, and panda lattes, raspberry pi's, Windows, and Linux are all likely to be around for a while and not become obsolete. Ideally, the SDE embodiments are embedded into a device which would have at least 2 network feeds, and routing capability, which is fulfilled by e.g. the laptop and panda latte, but can also be fulfilled by other configurations.

However, supposing software implementation within an existing processing module is impractical because of issues such as legacy qualifications, size, weight, power or other issues, the SDE software can be implemented in its own hardware container on its own processor and inserted into the signal communications path at the appropriate place.

Figure 14:
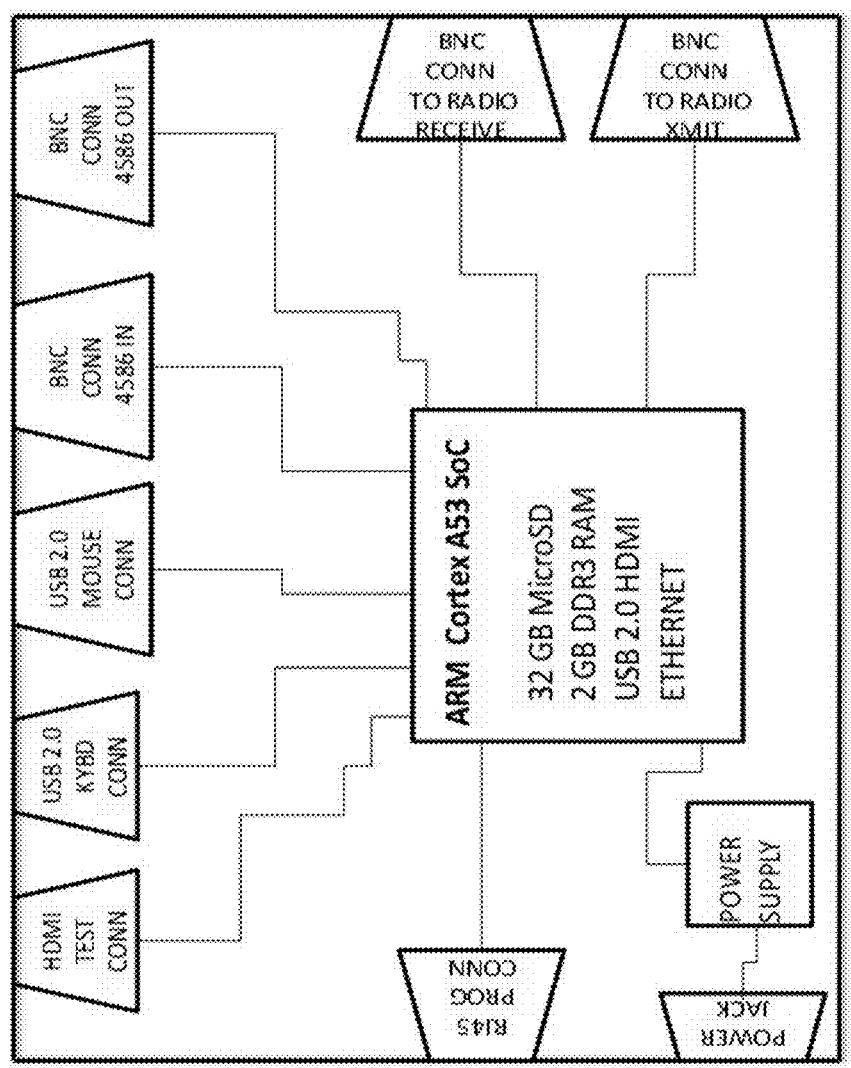
FIG. 14 shows a top-level hardware implementation of an embodiment of a ground control unit side.
Figure 15:
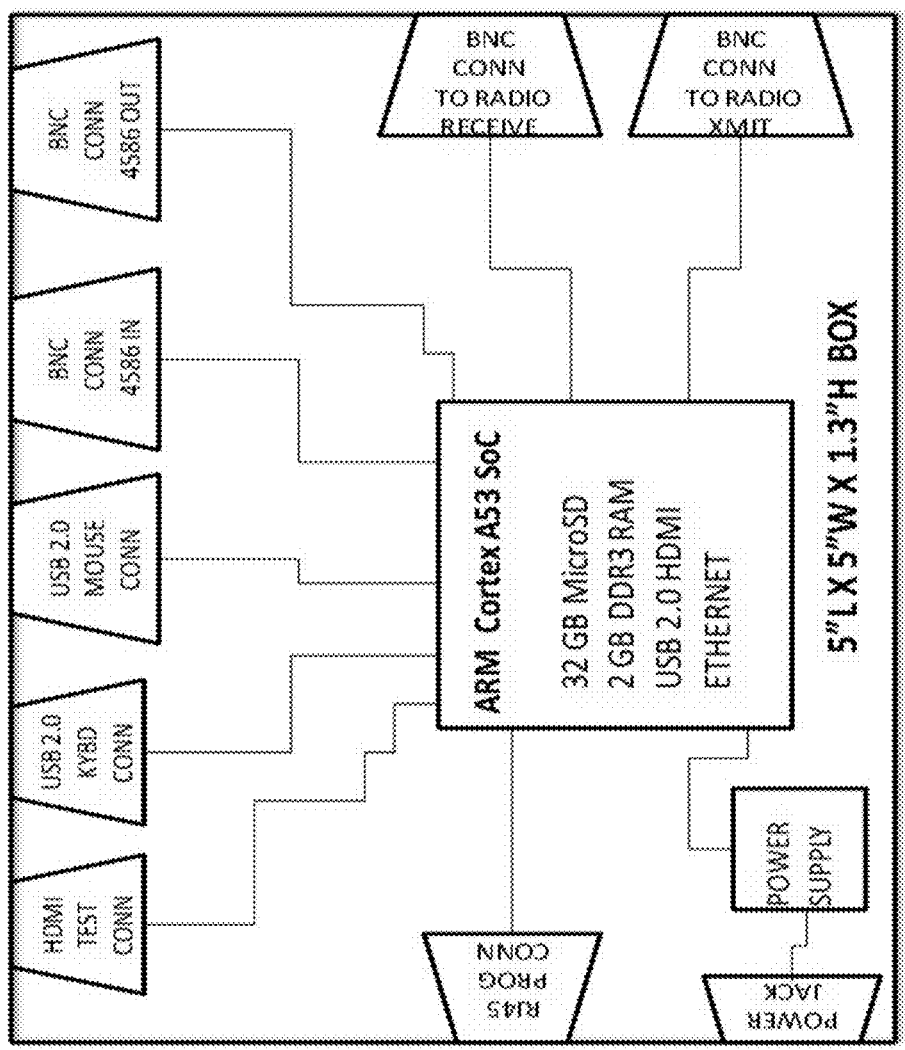
FIG. 15 shows a top-level hardware block diagram of an embodiment of a unmanned platform side.

FIGS. 14-15 show example hardware implementations. The following is an example-only, non-limiting list of potential components suitable for implementing an embodiment of SDE as a hardware system add-on: 12 V, 1 A power supply, with a DC Jack Output; and 4 BNC cables for e.g. 1) 4586 Messages In, 2) 4586 Messages Out, 3) Radio Receive, and 4) Radio Transmit. In an embodiment, additional requirements for loading a new program into the SDE hardware module might include RJ45 Ethernet Cable and computer, HDMI video cable, HDMI monitor, USB for a mouse, and USB for keyboard.

In an embodiment, an example SDE Board comprises 2 GB DDR3 RAM, an AMD embedded G-Series System-on-a-Chip (SoC), a GX210HA with 1 GHz dual core processor, and a 16 or 32 GB MicroSD Card.

Figure 16:
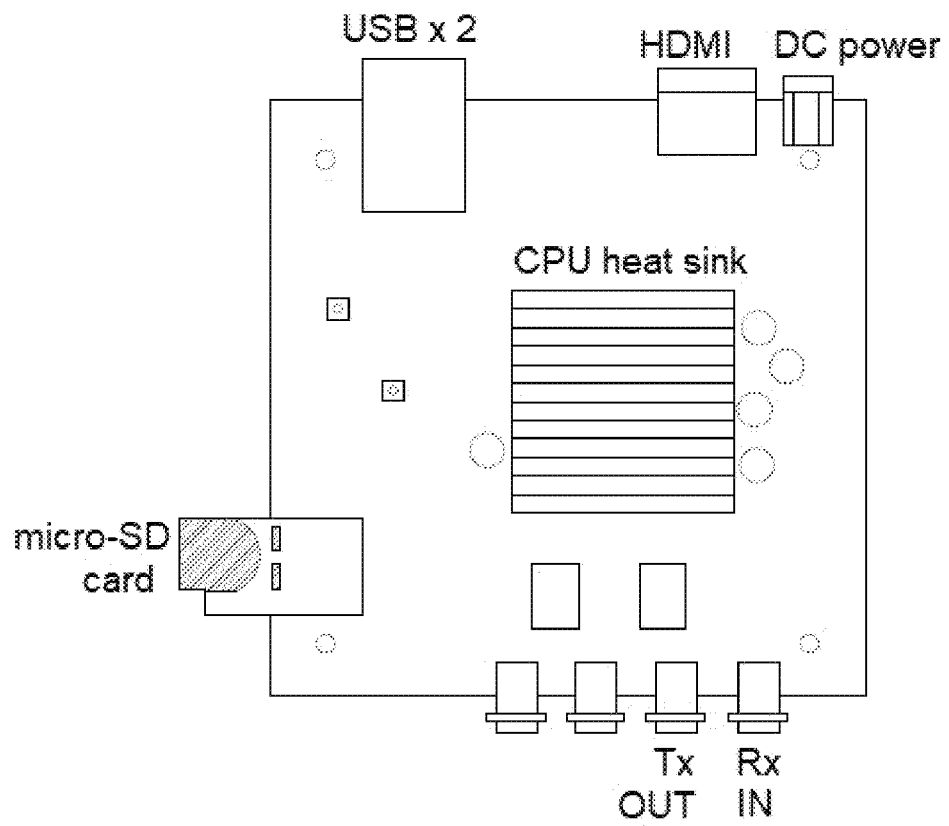
FIG. 16 shows an embodiment of an example hardware design diagram.

For clarification, FIG. 16 shows an example hardware design diagram.

The invention claimed is:

1. A method of structuring a Semiotic Digital Encoding (SDE) environment, comprising:
- configuring a base transmitting module for sending structured text messages;
- pairing a remote receiving module to be in communication with the base transmitting module;
- the structured text messages comprising both permanent unchanging data elements as well as changing data elements;
- converting the structured text message into a conceptual graph representation;
- forming the conceptual graph representation with individual text fields having connective fields for the structured text;
- performing a semiotic encoding of the structured text message by converting the structured text message into transferable data, such as machine code, and compiling the transferable data into a state transition table;
- the state transition table including individual values for the portions of the structured text that can be transferred via a low bandwidth communication system;
- for a given point in time, giving the encoded graph nodes values based on true or false conditions;
- transmitting the unchanging data elements in the form of software keys or playbooks which, when added to the changing data elements, represent a full message;
- matching the encoded graph nodes to the individual text fields of the conceptual graph representation; thereby
- once the state transition table and graph node output are established, the base transmitting module communicating the state table and the graph node output to the remote receiving module;
- the remote receiving module receiving the state table and graph node output;
- the remote receiving module recreating the conceptual graph representation;
- the remote receiving using the graph node output to fill the individual text fields of the conceptual graph representation; thereby
- recreating the original structured text message.

2. The method of claim 1, further comprising:
in situations with an oft-repeated baseline message, the base transmitting device sending only those delta values that vary from the baseline message.

3. The method of claim 1, further comprising:
the base transmitting module and the remote receiving module each comprising a laptop and a router.

4. The method of claim 1, further comprising:
- a select message set function within the base transmitting module selecting which message set to use;
- an encode function within the base transmitting module taking a raw message and outputting a SDE encoded message;
- a decode function within the remote receiving module taking the SDE encoded message and outputting the reconstructed raw message.

5. The method of claim 1, further comprising:
the remote receiving module providing an SDE acknowledgement message back to the base transmitting module.

6. The method of claim 4, further comprising:
the encoding process using a code embedded conceptual graph structure to process each field using the encode and decode functions.

7. The method of claim 1, further comprising:
a system-transparent software monitor observing and recording all SDE messages sent in both directions of the communication path.

8. The method of claim 1, further comprising:
implementing the encoding process as a separate hardware box within the base transmitting module so that any legacy software present in the communication remains compatible and is not disturbed.

9. The method of claim 1, further comprising:
- exploiting communications having a permanently structured message format;
- the permanent message structure being part of a known communications standard;
- the permanent message structure comprising up a majority of the information that is communicated between the base transmitting module and the remote receiving module;
- once the permanent structure is understood by both parties, removing the permanent structure from the communications stream, leaving only the changing data elements themselves to be transmitted and received;
- the remote receiving module adding the changed data elements to the permanent structure of the message thereby achieving a fully lossless representation of the original communication.

10. The method of claim 1, further comprising:
graphically rendering complex logic streams and systems designs needed for processing cognitive knowledge into conceptual graphs.

11. The method of claim 10, further comprising:
defining a number of states in a conceptual graph go as $2^N$ where N is the number of nodes in the graph such that with a graph with 10 nodes, 1028 separate decision states can be defined in only 10 bytes.

12. The method of claim 1, further comprising:
the base transmitting module transmitting a digital state table using less bandwidth than an ASCII transmissions of the same digital state table.

13. The method of claim 1, further comprising:
any entity intercepting the communication being required to know both the conceptual graph representation and the order of transmission of the elements of the state table to reconstruct the structured text message, otherwise the entity lacking ability to reconstruct the structured text message.

14. The method of claim 1, further comprising:
the encoding process being agnostic to whether the data being encoded contains messages or payload data, the encoding process requiring only that the messages are structured in some way.

15. The method of claim 1, further comprising:
in the event that the base transmitting module and the remote receiving module get out of sync, the remote receiving device sending back an acknowledgement saying that remote receiving module is going to sync signal to the base transmitting module therefore please send a regular message;

arranging that the next message comes through will be reset to be the total values, with no deltas involved and not using SDE;

the base transmitting module requesting to re-sync; and the remote receiving module then saying "yes, I received that message".

16. The method of claim 1, further comprising:

arranging that each communication of the paired modules to be individually configurable with a key.

17. The method of claim 16, further comprising:

incorporating the key into the communication link between the two modules.

18. The method of claim 16, further comprising:

incorporating the key as another layer in the SDE libraries.

19. The method of claim 1, further comprising:

implementing the SDE software as a library only, where only the library of encoded messages is supplied and the base transmitting module is responsible for monitoring message traffic and retrieving the corresponding message from the SDE library.

20. The method of claim 1, further comprising:

implementing the SDE software as a full software implementation, in which only a start/stop signal is required from the base transmitting module.

* * * * *